United States Patent
Li et al.

(10) Patent No.: US 6,175,829 B1
(45) Date of Patent: Jan. 16, 2001

(54) METHOD AND APPARATUS FOR FACILITATING QUERY REFORMULATION

(75) Inventors: Wen-Syan Li, Fremont, CA (US); K. Selcuk Candan, Scottsdale, AZ (US)

(73) Assignee: NEC USA, Inc., Princeton, NJ (US)

( * ) Notice: Under 35 U.S.C. 154(b), the term of this patent shall be extended for 0 days.

(21) Appl. No.: 09/064,069

(22) Filed: Apr. 22, 1998

(51) Int. Cl.[7] ................................................. G06F 17/30
(52) U.S. Cl. ........................... 707/3; 707/1; 707/104; 382/230
(58) Field of Search ....................... 707/3, 1, 104; 382/230

(56) References Cited

U.S. PATENT DOCUMENTS

| | | | |
|---|---|---|---|
| 5,647,058 | * 7/1997 | Agrawal et al. | 395/601 |
| 5,675,710 | * 10/1997 | Lewis | 707/10 |
| 5,696,962 | * 12/1997 | Kupiec | 707/4 |
| 5,930,783 | * 7/1999 | Li et al. | 707/1 |
| 5,933,822 | * 8/1999 | Harder et al. | 707/5 |

OTHER PUBLICATIONS

Kwon et al., "Inductive Learing Performance changing with relevant inputs", IEEE, pp. 1686–1690, Jan. 1998.*

Mi Hee et al. "Unified video retrieval system supporting simillarity retrieval", IEEE, pp. 884–888, Apr. 1999.*

Yoon et al. "Hybrid video information system supporting content based retrieval, similarity retrieval and query reformulation", IEEE, pp 1159–1164, Jan. 1999.*

Porkaew et al. "Query reformulation for content based multimedia retrieval in Mars", IEEE, pp 747–751, Sep. 1999.*

Anick et al. "Interactive document retrieval using faceted terminological feedback", IEEE, pp 1–12, Mar. 1999.*

Chang et al. "An extended query reformulation technique using materialized views", IEEE, pp. 931–936, Aug. 1998.*

Lee et al. "Semantic query reformulation in deductive databases", IEEE, pp 232–239, Jan. 1991.*

Lee et al., "Semantic and structural query reformulation for efficient manipulation of very large Knowledge bases", IEEE, pp. 369–374, Jan. 1990.*

Alp, et al., "Design, Implementation and Evaluation of Score," Proceedings of the 11th International Conference on Data Engineering, Mar. 1995, IEEE.*

J.R. Bach, et al., "The Virage Image Search Engine: An Open Framework for Image Management," Proceedings of the SPIE—The International Society for Optical Engineering: Storage and Retrieval for Still Image and Video Databases IV, Feb., 1996.*

(List continued on next page.)

Primary Examiner—Hosain T. Alam
Assistant Examiner—Jean Corrielus
(74) Attorney, Agent, or Firm—Sughrue, Mion, Zinn, Macpeak & Seas, PLLC

(57) ABSTRACT

A method and apparatus for verifying a query to provide feedback to users for query reformulation. By utilizing selectivity statistics for semantic and visual characteristics of image objects, query verification "examines" user queries and allows users to reformulate queries through system feedback. Feedback information provided to the user includes (1) the maximum and minimum number of matches for the query; (2) alternatives for both semantic and visual-based query elements; and (3) estimated numbers of matching images. Additional types of feedback information may also be provided. With this feedback, the users know if the query criteria is too tight (i.e. too few matches will be retrieved) or too loose (i.e. too many matches will be retrieved) so that they can relax, refine, or reformulate queries or leave queries unchanged accordingly. Only after queries are verified to have a high possibility of meaningful results, are the queries processed. Through this type of systematic feedback, users can query and explore multimedia databases, for example, by honing in on target images without expensive query processing. This provides a reduction in expensive query processing and system load.

53 Claims, 12 Drawing Sheets

OTHER PUBLICATIONS

Carey, et al., "Pesto: An Integrated Query/Browser for Object Databases," Proceedings of the 1996 VLDB Conference, Sep., 1996.*

Carson, et al., "Color and texture–based image segmentation using em and its application to image querying and classification," Submitted to IEEE Transaction on Pattern Analysis and Machine Intelligence, 1997.*

Del Bimbo, et al., "Shape Indexing by Structural Properties," Proceedings of the 1997 IEEE Multimedia Computing and Systems Conference, pp. 370–378, Jun., 1997.*

Flickner, et al., "Query by Image and Video Content: The QBIC System," IEEE Computer, 28(9):23–32, Sep., 1995.*

Hirata, et al., "The Concept of Media–based Navigation and its Implementation on Hypermedia Syst4em "Miyabi"" NEC Research & Development, 35(4):410–420, Oct., 1994.*

Li, et al., "Facilitating Multimedia Database Exploration through Visual Interfaces and Perpetual Query Reformulations," Proceedings of the 23$^{rd}$ International Conference on Very Large Data Bases, pp. 538–547, Aug., 1997.*

Prasad Sistla, et al., "Similarity based Retrieval of Pictures Using Indices on Spatial Relationships," Proceedings of the 1995 VLDB Conference, Sep. 23–25, 1995.*

Roth, et al., "The Garlic Project," Proceedings of the 1996 ACM SIGMOD Conference, May, 1996.*

Smith, et al., "VisualSeek: A Fully Automated Content–based Image Query System," Proceedings of the 1996 ACM Multimedia Conference, pp. 87–98, 1996.*

Kau, et al, "MQL—A Query Language for Multimedia Databases," Proceedings of 1994 ACM Multimedia Conference, pp. 511–516, 1994.*

Gerard Salton, "Automatic Text Processing: The Transformation, Analysis, and Retrieval of Information by Computer," Addison–Wesley Publishing Company, Inc., 1989.*

* cited by examiner

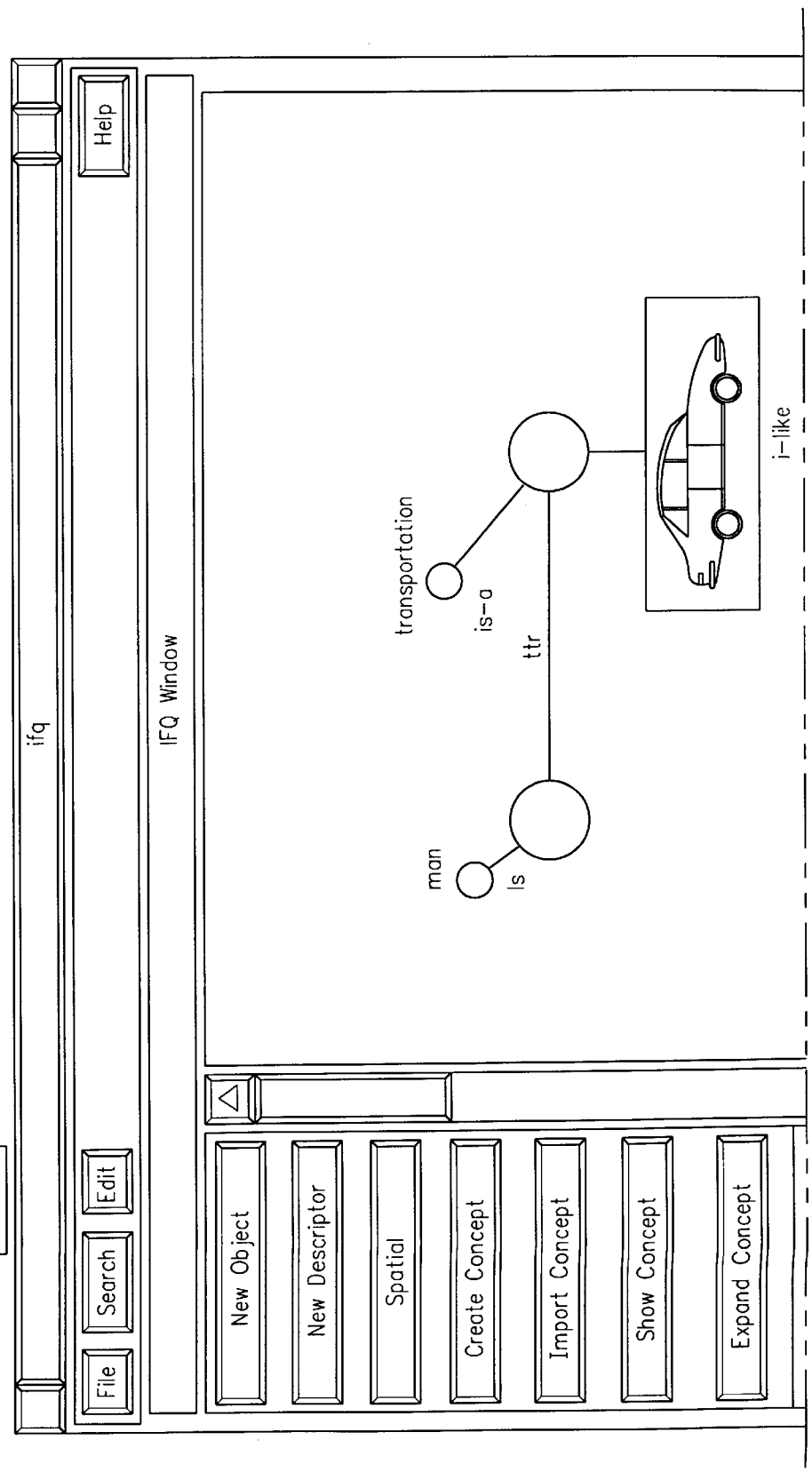

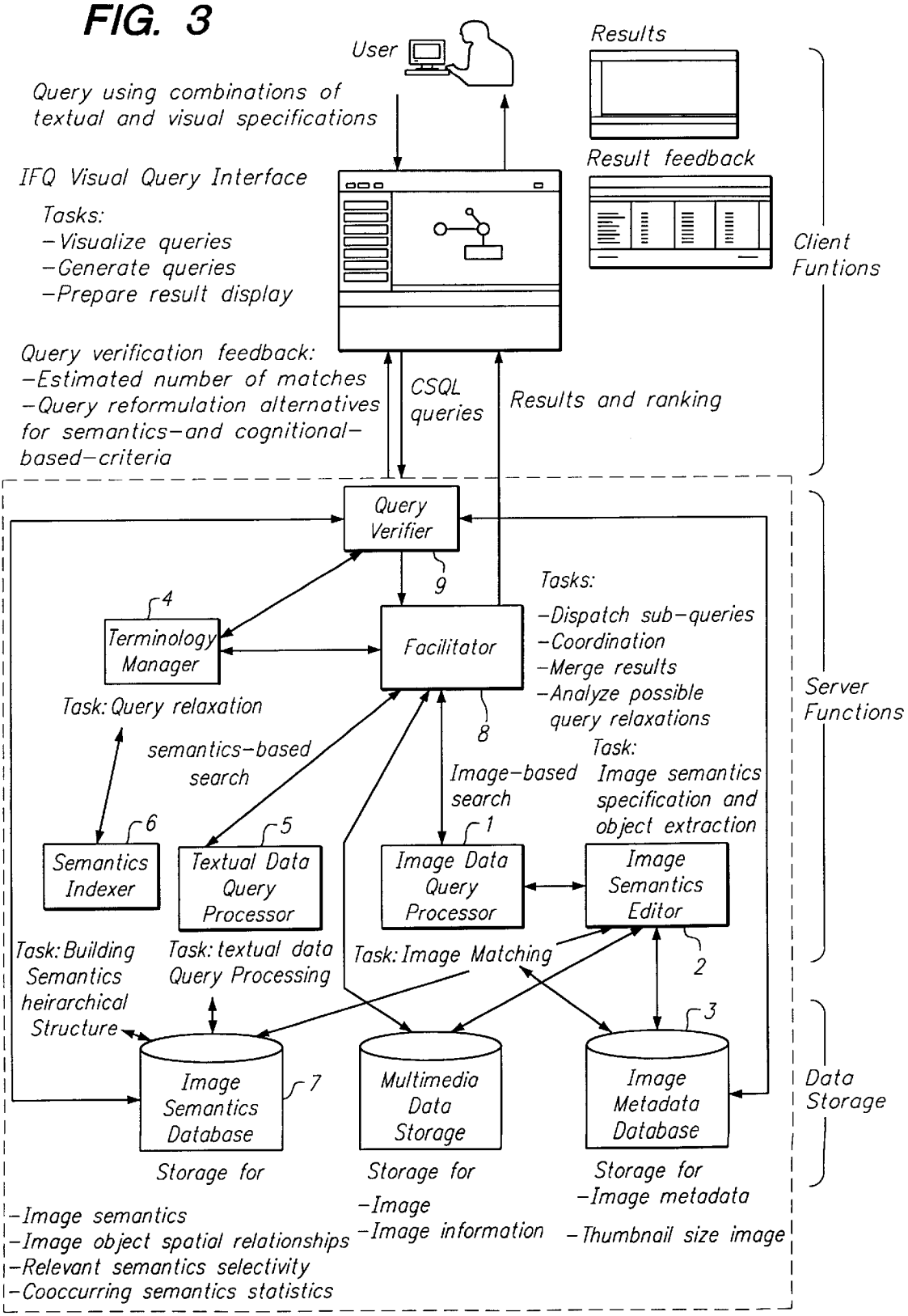

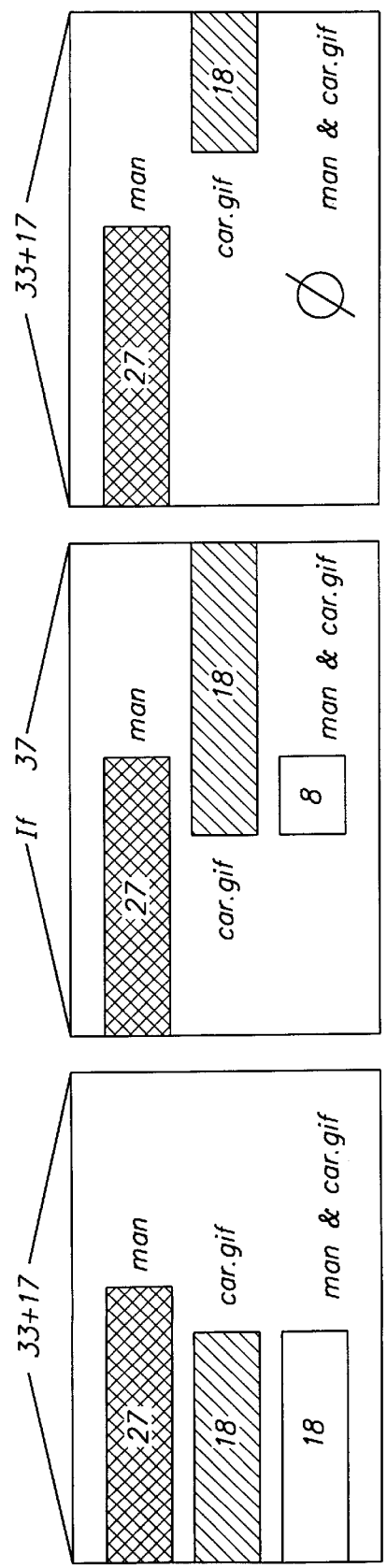
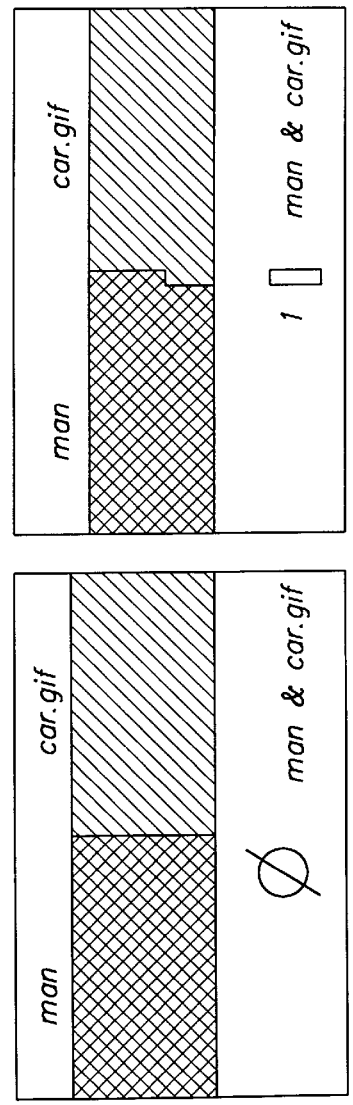
FIG. 9A
FIG. 9B
FIG. 9C
FIG. 9D
FIG. 9E

METHOD AND APPARATUS FOR FACILITATING QUERY REFORMULATION

BACKGROUND OF THE INVENTION

1. Field of the Invention

This invention relates generally to the field of verifying queries which may be applied to multimedia databases, hypermedia databases and image retrieval systems on the World Wide Web. The issuer of the query is then allowed to adjust the elements of the query based upon feedback provided to the issuer as a result of the verification.

2. Description of the Related Art

The contents of traditional database systems are precise. Hence, queries applied to such databases produce deterministic answers. Query processing in multimedia databases, for example, is different from query processing in traditional database systems. For example, image retrieval in multimedia databases requires a more comprehensive consideration of various types of visual characteristics, such as color and shape. In general, such visual characteristics cannot be specified completely. As a result, image matching in multimedia databases is based on similarity, rather than equality. Since image retrieval requires similarity based on both keyword (i.e. semantics) and visual characteristic comparisons, multimedia database query processing should be viewed as a combination of (1) information retrieval notions, described in Salton, "Automatic Text Processing: The Transformation, Analysis, and Retrieval of Information by Computer," Addison-Wesley Publishing Company, Inc., 1989 (relevance feedback, inexact match, word mismatch, query expansion); (2) Object Relational Database Management System (ORDBMS) or Object Oriented Database Management System (OODBMS) database notions (recognition of specific concepts, variety of data types, spatial relationships between objects); and (3) computer-human interaction (CHI) notions (interactions with the multimedia databases to perpetually reformulate queries for honing in on target images).

Relevant prior systems will now be discussed. The Virage Image Retrieval Engine is a system for image retrieval based on visual features, including color, shape, or texture and other domain specific features. See J. R. Bach et al., "The Virage Image Search Engine: An Open Framework for Image Management," Proceedings of the SPIE—The International Society for Optical Engineering: Storage and Retrieval for Still Image and Video Databases IV, February 1996. Virage has a query language based on structured query language (SQL), extended by user-defined data types and functions. Query By Image Content (QBIC), developed at the International Business Machines Corporation (IBM), is another system that supports image retrieval using visual examples. See Flickner et al., "Query by Image and Video Content: The QBIC System," IEEE Computer, 28(9):23–32, September 1995. Virage and QBIC both support image matching and keyword-based retrieval functionality on the whole image level. However, neither of them provides semantics-based access to objects in images. Another problem with both the QBIC system and the Virage system relates to reformulation granularity. Both QBIC and Virage allow users to reformulate queries only by selecting an entire image from the result. Thus, the reformulation granularity is an entire image. These systems fail to provide a scheme which supports a finer granularity of reformulation, e.g. using objects within an image.

Garlic (Roth et al., "The Garlic Project," Proceedings of the 1996 ACM SIGMOD Conference, May 1996) and PESTO (Carey et al., "PESTO: An Integrated Query/Browser for Object Databases," Proceedings of the 1996 VLDB Conference, September 1996) are two other projects at IBM related to multimedia, which focus on integrating and browsing/querying images in heterogeneous and distributed information sources respectively. PESTO allow users to specify tables and attributes for join/project and other aggregation functionality for multimedia information retrieval.

SCORE is a similarity-based image retrieval system developed at University of Illinois at Chicago. See Alp, et al., "Design, Implementation and Evaluation of SCORE, Proceedings of the 11th International Conference on Data Engineering, March 1995, IEEE; Prasad, et al., "Similarity based Retrieval of Pictures Using Indices on Spatial Relationships," Proceedings of the 1995 VLDB Conference, Sep. 23–25 1995. This work focuses on the use of a refined entity relation (E-R) model to represent the contents of pictures and the calculation of similarity values between E-R representations of images stored and query specifications. However, SCORE does not support image matching.

VisualSeek is a content-based image query system developed at Columbia University. See Smith et al., "VisualSeek: A Fully Automated Content-based Image Query System," Proceedings of the 1996 ACM Multimedia Conference, pages 87–98, 1996. VisualSeek uses color distributions to retrieve images. Although VisualSeek is not object-based, it provides region-based image retrieval. Users can specify how color regions shall be placed with respect to each other. VisualSeek also provides image comparisons and sketches for image retrieval. However, VisualSeek is designed for image matching, and does not support retrieval based on semantics at either the image level or the object level.

MQL is a multimedia query language. See Kau et al., "MQL—A Query Language for Multimedia Databases," Proceedings of 1994 ACM Multimedia Conference, pages 511–516, 1994. The syntax of the MQL is select <A><V> from <R> where <C>, in which <A> is a list of attributes to be retrieved, <V> is the result of version, <R> is the domain class, and <C> is a condition. Kau et al. claim MQL can support complex object queries, version queries, and nested queries (e.g. IN). MQL also supports a "contain" predicate through pattern matching on images, voice, or text. However, additional parameters to control the relaxation of query processing are not provided.

Classification has long been used to increase the efficiency of searches on large scale databases by filtering out unrelated information. Hirata et al., "The Concept of Media-based Navigation and its Implementation on Hypermedia System 'Miyabi'," NEC Research & Development, 35(4):410–420, October 1994 focuses on color information. Hirata et al. extract color values from images and map them onto HLS color spaces. Based on the resulting clusters, users can access image directories or filter out images for searching.

Del Bimbo et al., "Shape Indexing by Structural Properties," Proceedings of the 1997 IEEE Multimedia Computing and Systems Conference, pages 370–378, June 1997 focuses on clustering by shape similarity. Based-on the multi-scale analysis, Del Bimbo et al. extract the hierarchical structure of shape. According to this hierarchical structure, Del Bimbo et al. attempt to provide more effective search capabilities. However, this method is based on boundary analysis and assumes that boundaries are extracted correctly. Images from the Web usually include many elements and, thus it is hard to determine the boundaries of primary objects.

QBIC clusters images using feature vectors. Carson et al., "Color and texture-based image segmentation using em and its application to image querying and classification," Submitted to IEEE Transaction on Pattern Analysis and Machine Intelligence, 1997, extract objects from images based on the color and texture. Using the combination of extracted objects and their attributes (top two colors and texture) Carson et al. try to categorize the images into several groups. In this work, shape and positional information are not considered.

Several problems exist with the prior systems. First, many existing systems, e.g. QBIC and Virage, support query reformulation by providing query results as feedback for users to select one of the candidate images as the new query. Based on experiments on a database of 1,000 images, an average of 25 query reformulations is required using this method. The query model introduced in Li et al., "Facilitating Multimedia Database Exploration through Visual Interfaces and Perpetual Query Reformulations," Proceedings of the 23rd International Conference on Very Large Data Bases, pages 538–547, August 1997, allows users to reformulate queries based on system feedback of three different types of criteria. However, the feedback is based only on semantics and is not based on visual characteristics. This reference to Li et al., and each of the references discussed throughout, are hereby incorporated by reference herein. In Li et al., the system feedback is generated through expensive query processing. Since the users may reformulate queries perpetually for honing in on target results, such frequent query processing may put heavy loads onto the system.

Second, coming up with too many or too few matches is not satisfactory. In a typical image retrieval process, if there are too many matching images, the user tightens, or refines, the query criteria. If there are too little or no matches, the user relaxes the query criteria. The reformulation proceeds until the number of candidate images is within an acceptable range so that the user can browse through the candidate images.

Third, there is often a lack of heterogeneity between a user's terminology and the semantics specified in the multimedia databases. The problem of word mismatches arises because the vocabulary employed by the database authors and users may be different. This problem further expands in image retrieval since there may be a mismatch in both visual characteristics and terminology. For example, a user may want to retrieve images containing a car. However, the database may only contain the semantics "transportation," "automobile," and "truck." In this case, the system needs to relate the images in the database with the user's query based on semantics association during the query specification phase or in the query processing phase.

SUMMARY OF THE INVENTION

The present invention is directed to a method and apparatus for verifying a query to provide feedback to users for query reformulation. By utilizing selectivity statistics for semantic and visual characteristics of image objects, query verification "examines" user queries and allows users to reformulate queries through system feedback. This verification process is performed without the need for expensive query processing. Feedback information provided to the user includes (1) the maximum and minimum number of matches for the query; (2) alternatives for both semantic and visual-based query elements and (3) estimated numbers of matching images. The query elements are sub-queries which are used to retrieve a particular subset of images which satisfy a condition specified in the sub-query. The condition can be semantic or visual based and spatial relationships may also be specified by the condition. Additional types of feedback information may also be provided. With this feedback, the users know if the query criteria is too tight (i.e. too few matches will be retrieved) or too loose (i.e. too many matches will be retrieved) so that they can relax, refine, or reformulate queries or leave queries unchanged accordingly. Only after queries are verified to have a high possibility of meaningful results, are the queries processed. Through this type of systematic feedback, users can query and explore multimedia databases, for example, by honing in on target images. This provides a reduction in expensive multimedia query processing.

BRIEF DESCRIPTION OF THE DRAWINGS

The above objects and advantages of the present invention will become more apparent by describing in detail preferred embodiments thereof with reference to the accompanying drawings in which:

FIG. 3 shows the SEMantics and COGnition-based image retrieval system (SEMCOG) architecture.

FIG. 9 shows the maximum and minimum number of matching images.

DETAILED DESCRIPTION OF THE INVENTION

A preferred embodiment of a method and apparatus for verifying a query to provide feedback to users for query reformulation is described below in detail with reference to the accompanying drawings. It is to be noted that while the following discussion is presented in the context of the SEMantics and COGnition-based image retrieval system (SEMCOG), the present invention is not so limited. The present invention may be applied to a variety of image retrieval systems for multimedia databases, hypermedia databases and image retrieval systems on the World Wide Web (WWW) etc.

Existing image retrieval systems consist of three steps in a computer-human interaction (CHI) cycle: query specification, query processing and query reformulation. In order to circumvent some of the problems associated with multimedia databases, the present invention introduces the notion of query verification between the steps of query specification and query processing. Query verification estimates the size of the answer set of a query and finds mismatches between the user's query specifications and the semantic and visual characteristics of images in the database. By utilizing selectivity statistics regarding image semantics and visual characteristics, a query verifier checks if a given query can produce satisfactory results for users. If there are too many or too few matches for a given query, the query verifier provides feedback to the user in the form of alternative query criteria as well as the strictness or selectivity of the alternative and the original criteria to reformulate the query. The query verifier only forwards to the query processor those queries which are likely to generate satisfactory results. After queries are processed, additional, more precise feedback may be provided to the user.

Figure 1:
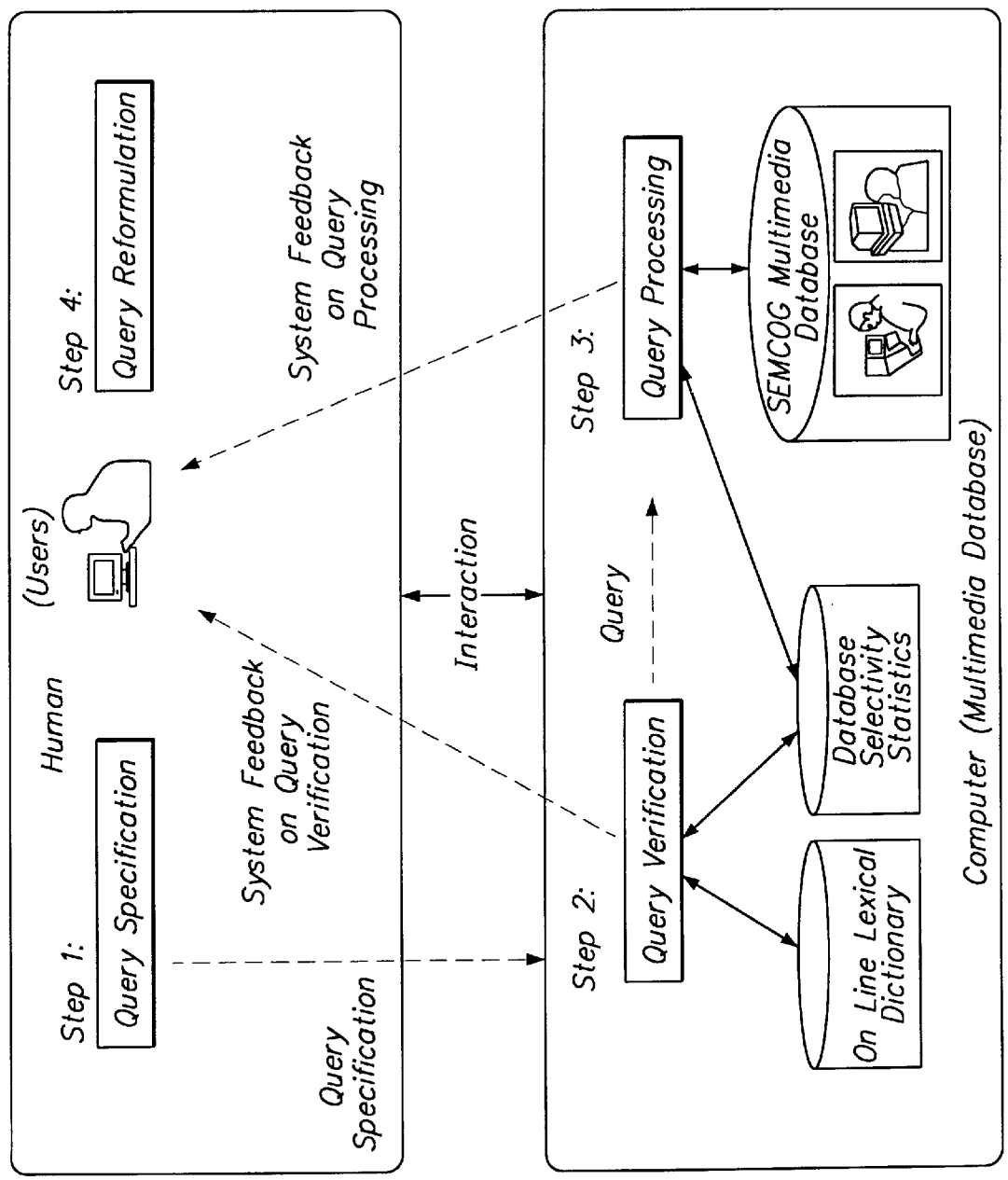
FIG. 1 shows the task and data flows of the facilitated multimedia database query model in accordance with an embodiment of the present invention.

The tasks and data flows of the query model with query verification and relevancy feedback in accordance with the present invention are illustrated in FIG. 1. FIG. 1 shows the four steps of query specification, query verification, query reformulation and query processing. These concepts have been applied to SEMCOG, for example, an advanced multimedia database system. (See Li et al., "SEMCOG: A Hybrid Object-based Image Database System and Its Modeling, Language, and Query Processing," Proceedings of The 14th International Conference on Data Engineering, February 1998).

Significant contributions of the present invention include: (1) Providing comprehensive feedback regarding the distribution of images using semantics and visual characteristics. Feedback is also provided to show whether and how queries should be relaxed, refined or reformulated; (2) Providing feedback without expensive query processing, where only verified queries are forwarded to the query processor.

Figures 2, 2A:
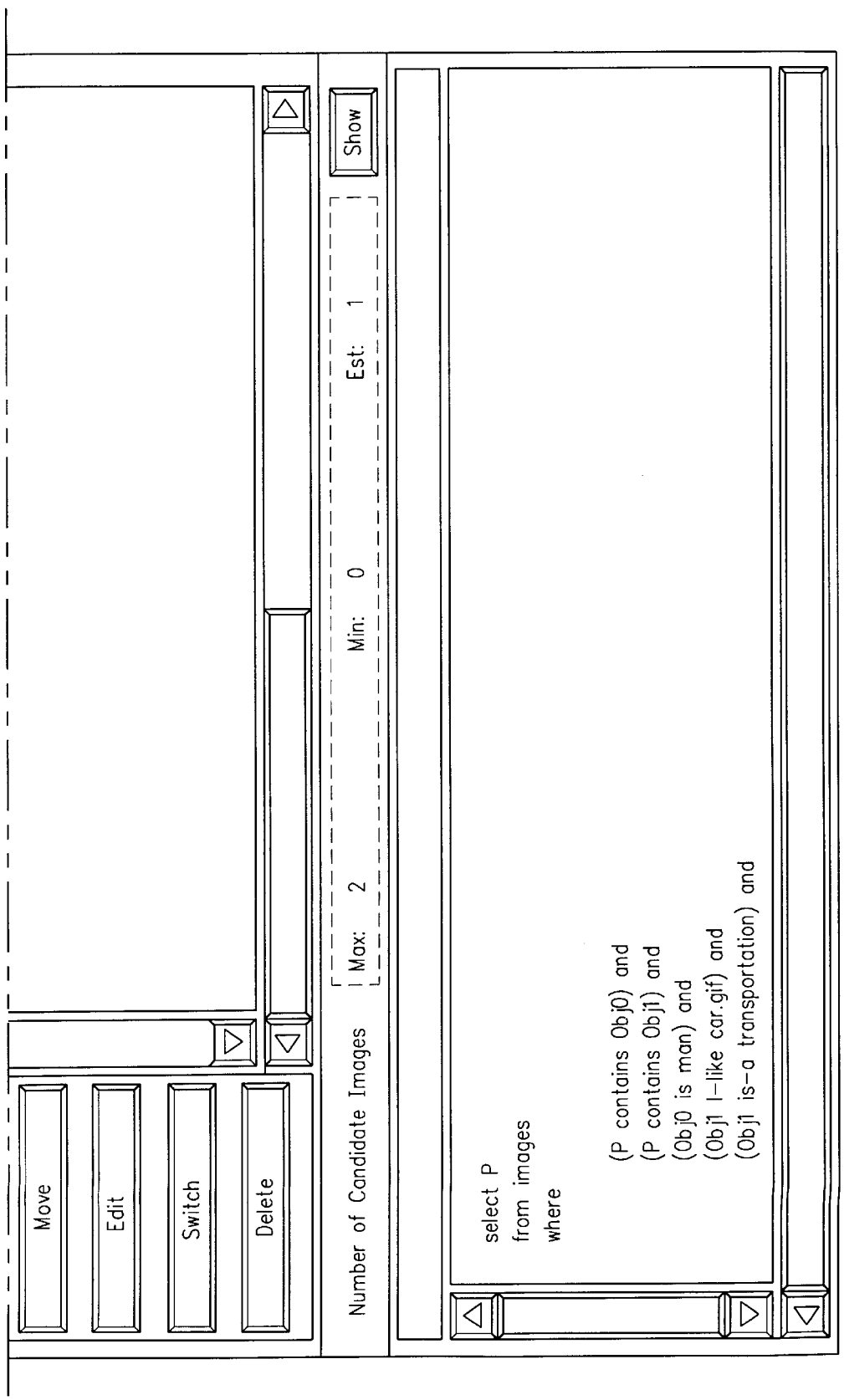
FIG. 2 shows a multimedia database query specification with system feedback in accordance with the present invention.

Further contributions of the present invention will be discussed in the context of an example query. FIG. 2(a) shows a query specification "retrieve images containing a man and transportation and the transportation looks like this given image". SEMCOG provides the following facilitation functionalities. Guided query specification and automated query generation are provided. More specifically, SEMCOG provides a visual interface for users to specify queries using icons and menus in a drag and drop fashion. This is shown in the In Frame Query (IFQ) window of FIG. 2(a). The actual query statement is automatically generated by the system in the Cognition and Semantics Query Language (CSQL) window, shown in the lower portion of FIG. 2(a). With the CSQL query generator, users are not required to be aware of the underlying schema, design and language syntax, which are complicated due to the complex model scheme for multimedia data.

In accordance with the present invention, the user is provided with the maximum, minimum, and estimated numbers of matches for the query as the query specification proceeds (the small window in the middle of the IFQ window shown in FIG. 2(a), labeled "Number of Candidate Images"). With this functionality, the user knows that if he/she should relax or refine the query.

Figure 2C:
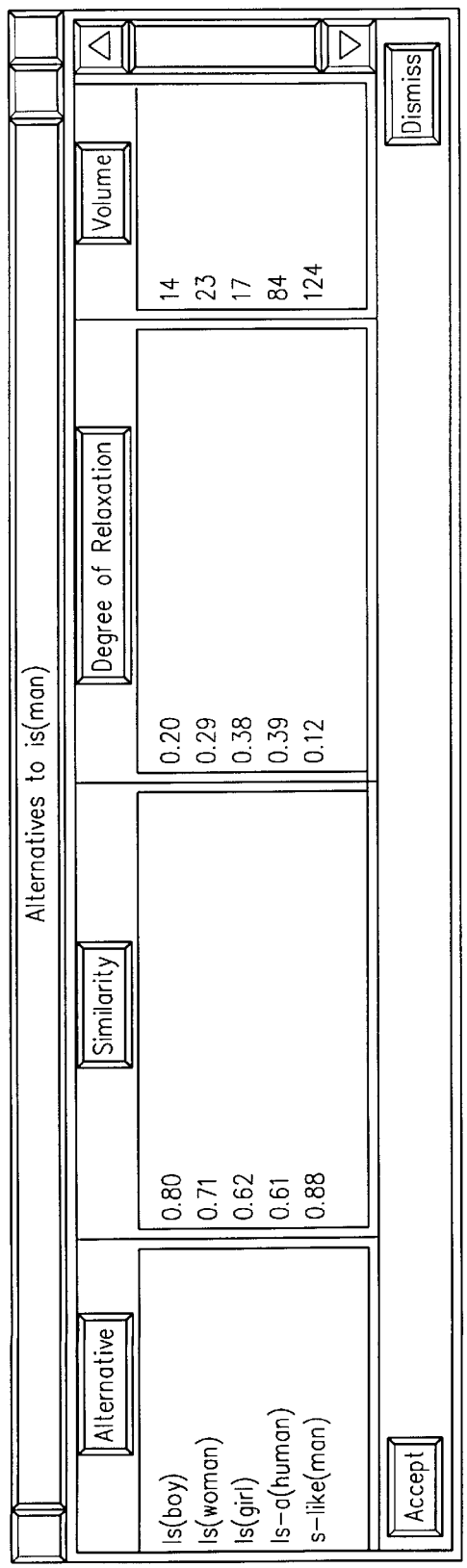
Figure 2F:
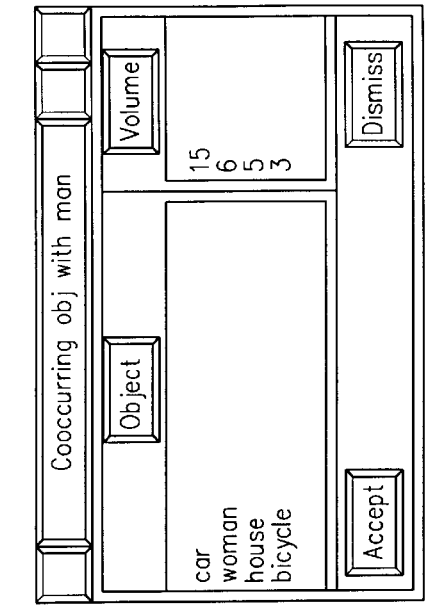
Figure 2B:
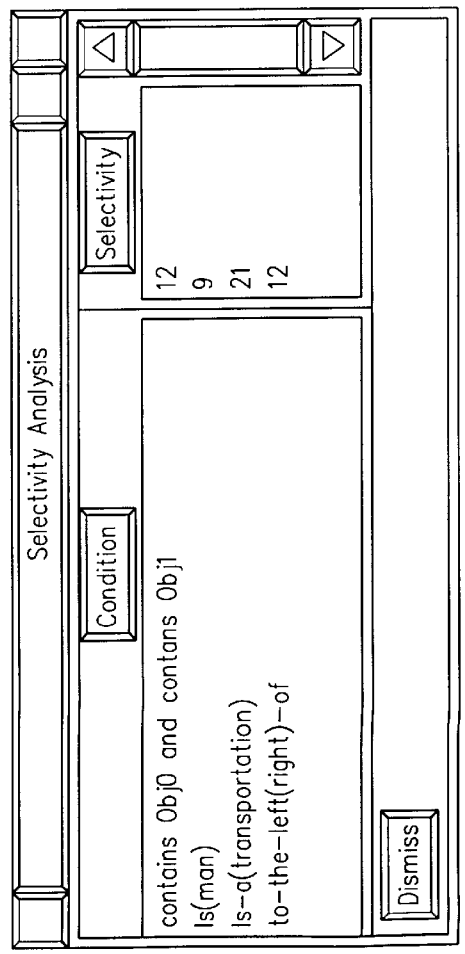

In accordance with the present invention, the user is also provided with relevance feedback. The user can click on the "show" button on the lower right side of FIG. 2(a) to view the detailed selectivity analysis for each query element. The strictness or selectivity of query criteria depends the number of occurrences of the query criteria in the database. This is shown in FIG. 2(b). These selectivity values are pre-computed and are used for query optimization purposes. Additional relevance feedback may be provided for semantic based elements. For each semantical condition, the user may be provided with (1) a set of alternative terms; (2) the similarity between each alternative condition and initial condition; and (3) the selectivity of the alternative conditions. FIG. 2(c) shows the system feedback window for the condition "is (man)". The feedback shows that "is(man)" can be relaxed to "isa(human)" or reformulated to "is(girl)", "is(woman)" or "is(boy)." The system may also provide feedback for object co-occurrence relationships. FIG. 2(f) shows a window providing system feedback for objects that are in the same image as a man. With this information, the user knows not only the fact some images contain both "man" and "transportation" (i.e. car and bicycle), but also the distribution and selectivity of objects which are in the same image with a man, such as car, bicycle, woman, and house.

Another type of feedback information is provided, in accordance with the present invention, for media or cognition based elements. For each media-based condition, such as for the query image for "isa(transportation)," the system provides relevance feedback in the form of similar colors and shapes, as well as the selectivity of images containing such colors and shapes. The system first extracts the primary color (i.e. gray), shown at the top of FIG. 2(d), and the most significant shape (i.e. a horizontal line), shown at the top of FIG. 2(e), from the query image. The system then provides alternative colors and shapes which are similar to the major color and shape of the query image. Based on the feedback, the user can know there are few images with the color gray, and also can know that there are probably very few images containing white cars, since the image selectivity for the white color is only 6.

Now some background information regarding the design and functionality of SEMCOG will be discussed. In SEMCOG, images are modeled as a hierarchical structure that supports queries at both the whole image and object levels. An object is defined as a set of homogeneous (in terms of colors) and continuous segments. Since images are modeled as hierarchical structures, image modeling is implemented as user defined types in SQL3, with access methods implemented as user defined functions. CSQL is the underlying query language used in SEMCOG. (See Li et al., "SEMCOG: A Hybrid Object-based Image Database System and Its Modeling, Language, and Query Processing," Proceedings of The 14th International Conference on Data Engineering, February 1998). CSQL provides greater flexibility for multimedia queries. Image retrieval related predicates in CSQL include: (1) Semantics based predicates: "is" (man vs. man), "is_a" (e.g. car vs. transportation) and "s_like" (semantically alike) (e.g. car vs. truck); (2) Media based predicates: "i_like" (visually alike) that compare visual characteristics of two arguments; and (3) Spatial relationship based predicates: "above," "below," "right," "left," etc.

Figure 4:
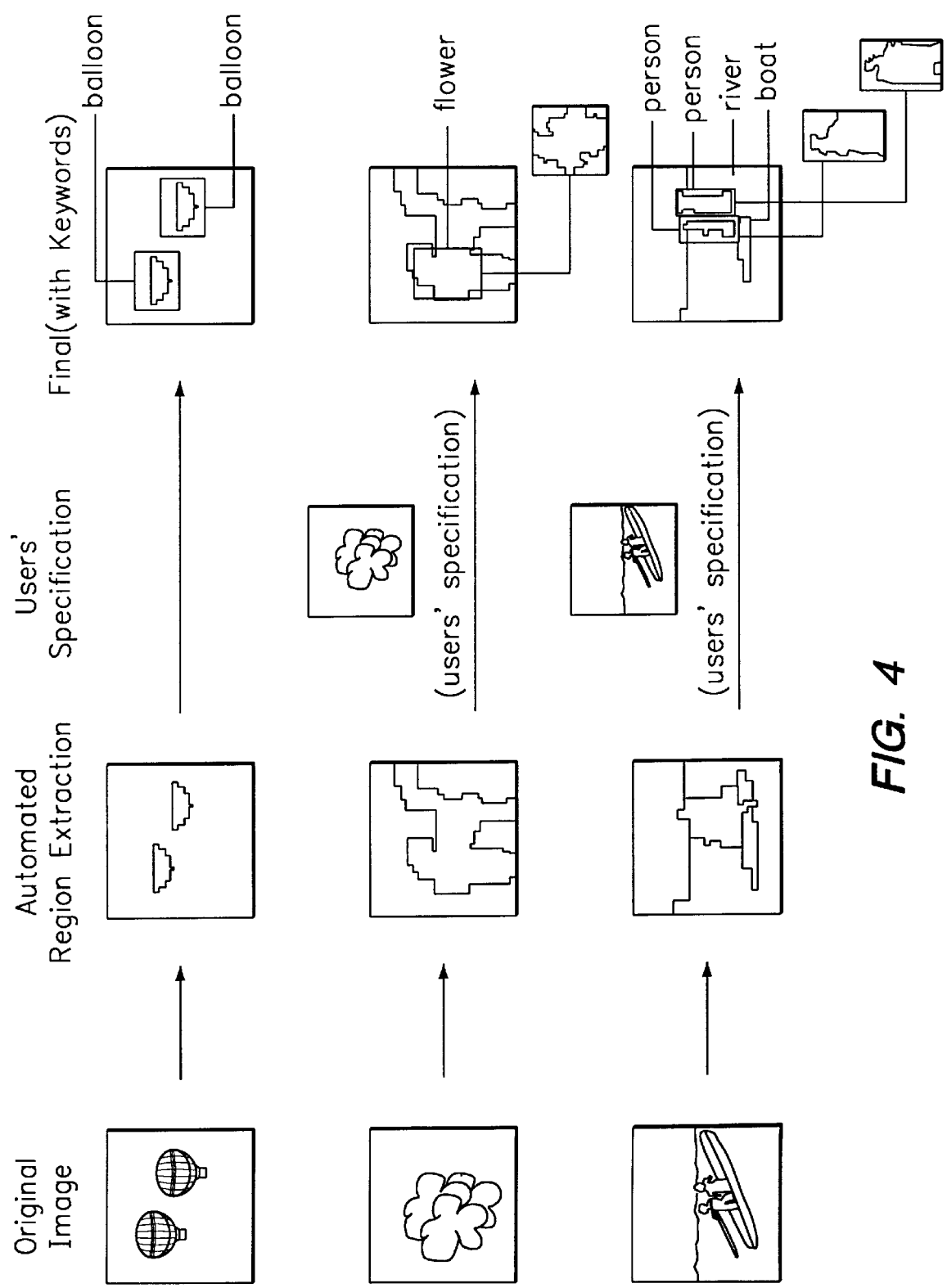
FIG. 4 shows region extraction and semantics specification.

As background, the architecture of SEMCOG is shown in FIG. 3, and its components and functionalities are discussed as follows. The Image Data Query Processor 1 is used to perform the image matching task. COIR (Content-Oriented Image Retrieval) is the image processing module employed in SEMCOG. (See Hirata, et al., "Content-Oriented Integration in Hypermedia Systems," Proceedings of 1996 ACM Conference on Hypertext, pages 11–21, March, 1996). COIR performs image matching at the object level. When an image is registered in SEMCOG, image descriptions, such as the image size, image format, registration date, etc. are automatically extracted. However, other metadata, such as the semantics of images, cannot be automatically extracted. Image Semantics Editor 2 is designed to interact with COIR to specify image semantics. FIG. 4 illustrates how image regions and their semantics are specified. On the left side of FIG. 4, there is a set of images. First, COIR extracts regions in these images based on color homogeneities and segment continuities. Then, COIR shows the region extraction results to the user for verification. In this example, the user overrides the system's recommendation and specifies proper region segmentations for the second and third images. After justification, the user associates the semantics of each region. Returning to FIG. 3, the image metadata, associated with image visual characteristics, are stored in the Image Metadata Database 3.

In FIG. 3, Terminology Manager 4 maintains a terminology base that is used for query term relaxation. By consulting with Terminology Manager 4, SEMCOG can find synonyms for a given term and access "is a" hierarchies. For predicates, such as "is-a transportation" or "s-like man", Terminology Manager 4 returns multiple resulting terms with their relevance ranking. Many existing lexical reference systems, such as WordNet (Miller, "WordNet: A Lexical Databases for English," Communications of the ACM, pages 39–41, November 1995), can be employed as a terminology base.

Textual Data Query Processor 5 processes queries concerning image or object semantics, which are stored as textual data. SEMCOG stores both locations of objects and their relative horizontal and vertical spatial relationships as two-dimensional strings, for example. This storage may take other forms. Chang et al., "An Intelligent Image Database System," IEEE Transaction on Software Engineering, 14(5): 681–688, 1988. With two-dimensional strings, spatial relationship queries are converted to text based queries so that no computation on the spatial relationships of the objects is needed during the query processing. Image semantics are constructed hierarchically, by Semantics Indexer 6, based upon predicates and are stored in Image Semantics Database 7. Facilitator 8 coordinates interactions between the components of the system architecture. Facilitator 8 performs the following tasks: (1) Query relaxation, reformulating query statements containing "is-a" or "s-like" predicates by consulting the terminology manager; (2) Forwarding query statements containing "i-like" or "contains" (visually) predicates to Image Data Query Processor 1 to perform image matching, while forwarding other non-image-matching operation statements to Textual Data Query Processor 5; and (3) Result integration, merging the results of image-matching query statements and non-image-matching operation statements. These tasks include computing overall similarity values and eliminating images based on specified filtering constraints.

Query Verifier 9 provides useful feedback during the query specification phase, including estimated numbers of matches and distributions of related semantic terms and visual characteristics. Query Verifier 9 associates users' queries with contents in the database to resolve the problem of word mismatch. To perform these tasks, Query Verifier 9 requires access to the database statistics stored in the Image Semantics Database 7, the Image Metadata Database 3 and the Terminology Manager 4.

A detailed discussion of the indexing schemes for image object semantics and visual characteristics will be now be presented. The determination of selectivity statistics will also be discussed. This information is used for advanced query reformulation functionalities and query processing optimization.

Like most database systems, SEMCOG periodically collects database statistics to improve the query processing performance. One unique functionality of SEMCOG is to use selectivity and indices of semantics to recommend query reformulation alternatives to users. The indexing schemes for semantics in SEMCOG and usage of these indices and selectivity values will now be discussed.

Figure 5:
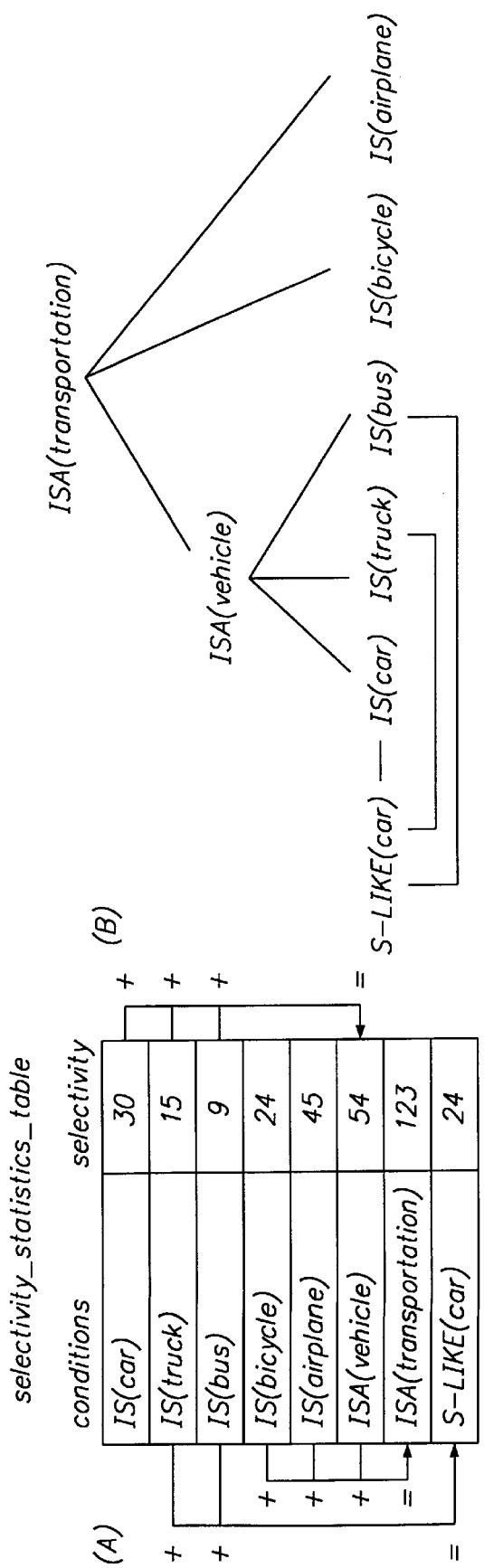
FIG. 5 shows a hierarchical structure for semantic selectivity.
Figure 6:
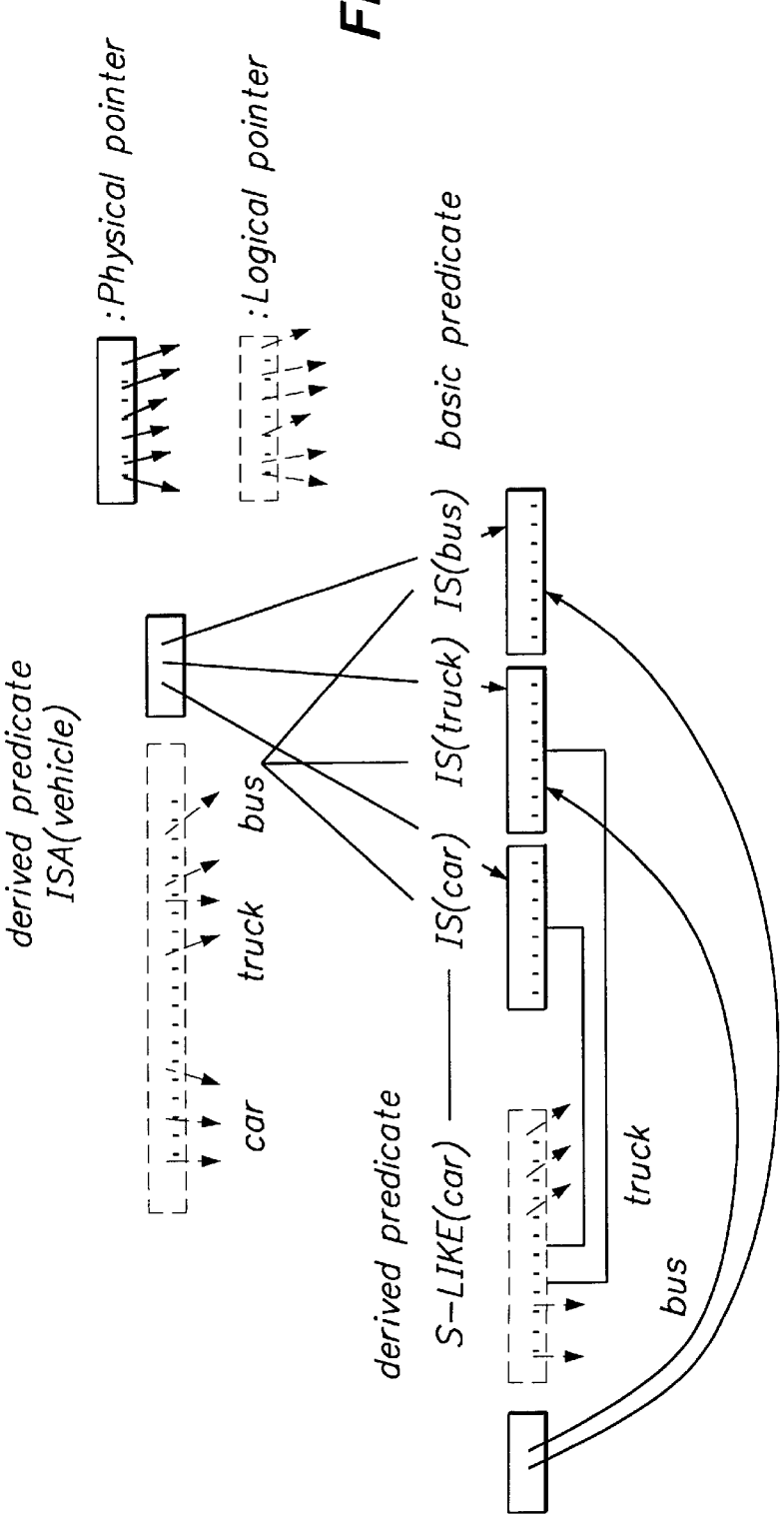
FIG. 6 shows hierarchically structured logical pointers.

FIG. 5 shows a hierarchical structure for semantic selectivity for objects related to transportation. This hierarchical structure is built based on the semantics in the Image Semantics Database 7 of FIG. 4 by consulting with Terminology Manager 4. Two types of mechanisms are employed to generate selectivity. For semantic terms which are less frequently updated and inserted, selectivity statistics are gathered periodically and off-line. For those semantic terms which are frequently updated and inserted, selectivity statistics are gathered daily or in real time through view management and triggers. The reason for the hierarchical structure shown in FIG. 5 is to take advantage of the fact that related predicates are also clustered in a hierarchical semantic structure. Two important uses of the hierarchical structure are as follows: (1) Some predicates can be translated into a disjunction of other predicates. For example, "ISA(vehicle, X)" can be translated into a disjunction of "IS(car,X), IS(truck,X), and IS(bus,X)"; (2) Clustered predicates can be reformulated from/to each other. For example, "IS(car,X)" can be reformulated horizontally to "S-LIKE(car,X)" or vertically to "ISA(vehicle,X)" or "ISA(transportation,X)". Hierarchically structured indexing takes advantage of (1). In order to provide quick response time, indices are built for each predicate. There are two types of predicates: basic and derived predicates. All "IS()" predicates are basic predicates, while "S-LIKE()" and "ISA()" predicates are derived. As shown in FIG. 6, "ISA(vehicle,X)" can be derived from a disjunction of "IS(carX)", "IS(truckX)", and "IS(bus,X)." "ISA(transportation,X)" can be derived from a disjunction of "ISA(vehicle,X)", "IS(bicycle,X)", and "IS(airplane,X)."

The semantic index construction is done in two steps. First, indices are built for basic predicates. These types of indices are called physical (or direct) indices. For instance, in the above example, indices for "IS(carX)," "IS(bus,X)," and "IS(truck,X)" are physical pointers pointing to corresponding objects. Next, indices are built for derived predicates. These indices, on the other hand, are logical. As shown in FIG. 6, the index for "ISA(vehicle,X)" is a logical index for tuples whose semantics are "car," "truck," or "bus." However, the physical index consists of only three pointers pointing to the physical indices of "IS(car,X)," "IS(car,X)," and "IS(truck,X)." Similarly, "S-LIKE(car,X)" consists of only two physical pointers, while logically, it consists of pointers to all objects whose semantics are "truck" or "bus."

Relevant semantics and their selectivity, which are used for dealing with word mismatch problems, will now be discussed. The relevant semantics database is used to assist users in visualizing the semantics terms that exist in the image database, including hypernyms, synonyms and holonyms. Suppose that the database contains a set of objects whose semantics are "man," "woman," and "human," but there are no objects whose semantics are specified as "person" or "child." With the relevant semantics database, when a user specifies a query using the term "person" or "child," SEMCOG can associate it with "man," "woman" and "human." Furthermore, SEMCOG can also provide the user with alternative terms which are relevant to "person" and have been specified in the database. In this example, the system can show the user alternative terms for "IS(person, X)" as "IS(man,X)," "IS(woman,X)," and "ISA(human,X)." Note that SEMCOG does not need to show the user the term "child," although it is relevant, since there will not be a match for a query to retrieve images containing a "child."

The system feedback also includes term and predicate similarity values and selectivity values for each of the alternatives. The selectivity is constructed as shown in FIG. 5. The term and predicate similarities are calculated as follows. The lexical dictionary used by SEMCOG, WordNet, provides semantic distance values, $0.0 \leq$ Distance $(\alpha, \beta) \leq 1.0$, for given terms $\alpha$ and $\beta$. (Richardson et al., "Using WordNet as a Knowledge base for Measuring Conceptual Similarity between Words," Proceedings of Artificial Intelligence and Cognitive Science Conference, 1994). Although the semantic values are arguable, this task is within the abilities of the ordinarily skilled artisan in domains in the field of linguistics.

Based on the term distance values returned by the dictionary, the similarity between predicates is calculated as follows:

Similarity between "IS($\alpha$,X)" and "IS($\beta$,X)," where $\alpha$ and $\beta$ are two terms, is 1–Distance($\alpha$, $\beta$).

Similarity between "IS($\alpha$,X)" and "S_LIKE($\alpha$,X)," where $\alpha$ is a term, is $$\frac{\sum_{i=1}^{n} 1 - \text{Distance}(\alpha, s_i)}{n},$$

where n is the number of synonym of $\alpha$ and each $s_i$, $1 \leq i \leq n$, is such a synonym. Such a similarity value can be used for query reformulation from, for instance, from "IS(car,X)" to "S_LIKE(car,X)," In this example, $\alpha$=car and $s_i \in$ {truck, bus, . . . }.

Similarity between "IS($\alpha$,X)" and "IS_A($\beta$,X)" is $$\frac{\sum_{i=1}^{m} (1 - \text{Distance}(\alpha, s_i))}{m},$$

where $\alpha$ and $\beta$ are two terms, $\beta$ is a hypernym of $\alpha$ and m is the number of hypernyms (excluding $\alpha$) of $\beta$. Such a similarity value can be used for query reformulation from, for instance, from "IS(car,X)" and "IS_A(transportation, X)." In this example, $\beta$=transportation and $s_i \in$ {truck, bus, airplane, . . .}.

Similarity between "S_LIKE($\alpha$,X)" and "IS_A($\beta$,X)" is $$\frac{\sum_{i=1}^{n} \sum_{j=1}^{m} (1 - \text{Distance}(h_j, s_i))}{m \times n},$$

where $\alpha$ and $\beta$ are two terms, each $h_j$, $1 \leq j \leq m$ is a hypernym of $\beta$, and each $s_i$, $1 \leq i \leq n$ is a synonym of $\alpha$. Such a similarity value can be used for query reformulation from, for instance, from "IS(car,X)" to "IS_A(transportation,X)." In this example, $\alpha$=car, $\beta$=transportation and $s_i \in$ {truck, bus, . . .}, and $h_i \in$ {truck, bus, boat, ship, airplane, . . . }

The degree of relaxation for reformulating the predicate $Pred_{from}$ to the predicate $Pred_{to}$ is defined as 1-similarity ($Pred_{from}$, $Pred_{to}$). These values are shown to users for visualizing how different the alternatives are from the original query condition. FIG. 2(c) shows a system feedback window dump for the condition "is(man)," including alternatives and the similarity/degree of relaxation between "is(man)" and each alternative.

The similarity calculation for predicate reformulation is also applied to automatic query relaxation. For example, a user submits a query to retrieve images containing a man with a car. If there is no exact match, SEMCOG can provide the best matches by automatically reformulating the initial query. The system may provide images which contain a man with a bus, a woman with a car, or a woman with a bus.

Although the system may find exact matches for the relaxed queries, these exact matches do not match the user's initial query. To rank the relevance of results by relaxed queries, the similarity values between the initial query conditions and alternative conditions are used as a penalty. As an example, assume that the similarity values among related predicates are as follows:

Similarity between "is(car)" and "is(bus): is 0.8

Similarity between "is(man)" and "is(woman)" is 0.7

The relevance (i.e. confidence) for the images containing a car and a man is 1, since these images match the query conditions perfectly. On the other hand, the results for relaxed queries are subject to the penalty. The degrees of relevance are generated as follows:

Images containing a man and a bus: 0.8

Images containing a woman and a car: 0.7

Images containing a woman and a bus: (0.56) [i.e. (0.8× 0.7)]

Along with the above information, SEMCOG also maintains co-occurrence relationships for objects. This information is used for providing feedback if a user specifies one object with a given semantics and wants to know what other objects are likely to be in the same image, without querying the database. Finding co-occurring objects is a useful and frequently used functionality in the query specification phase. SEMCOG maintains two-object co-occurrence selectivity. Since most of the image database applications collect images of particular topics, rather than images of arbitrary semantic meaning, keeping such information does not take a lot of storage space. For example, a stock photo agency may have sets of images for sports events, super models, and animals, where only a limited (application specific) set of semantic terms are used.

The indexing schemes and selectivity construction mechanisms used for visual information, that is, colors and shapes, will now be discussed.

To improve the average image retrieval time, images are classified in advance, according to their colors and shapes. In the image registration phase, the system extracts the visual characteristics of the images. Based on these visual characteristics, the system finds one or more clusters which match the given image the best and places the images in these clusters. The classification results, cluster centers (representative images) and the number of members in each cluster, are used as selectivity values for query optimization as well as the system feedback shown in FIGS. 2(c) and 2(d).

The creation of statistics using image classification will now be discussed. The image classification results described above are used in answering queries, in creating statistics used for query optimization, and in creating statistics used for feedback generation.

Figures 2D, 2E:
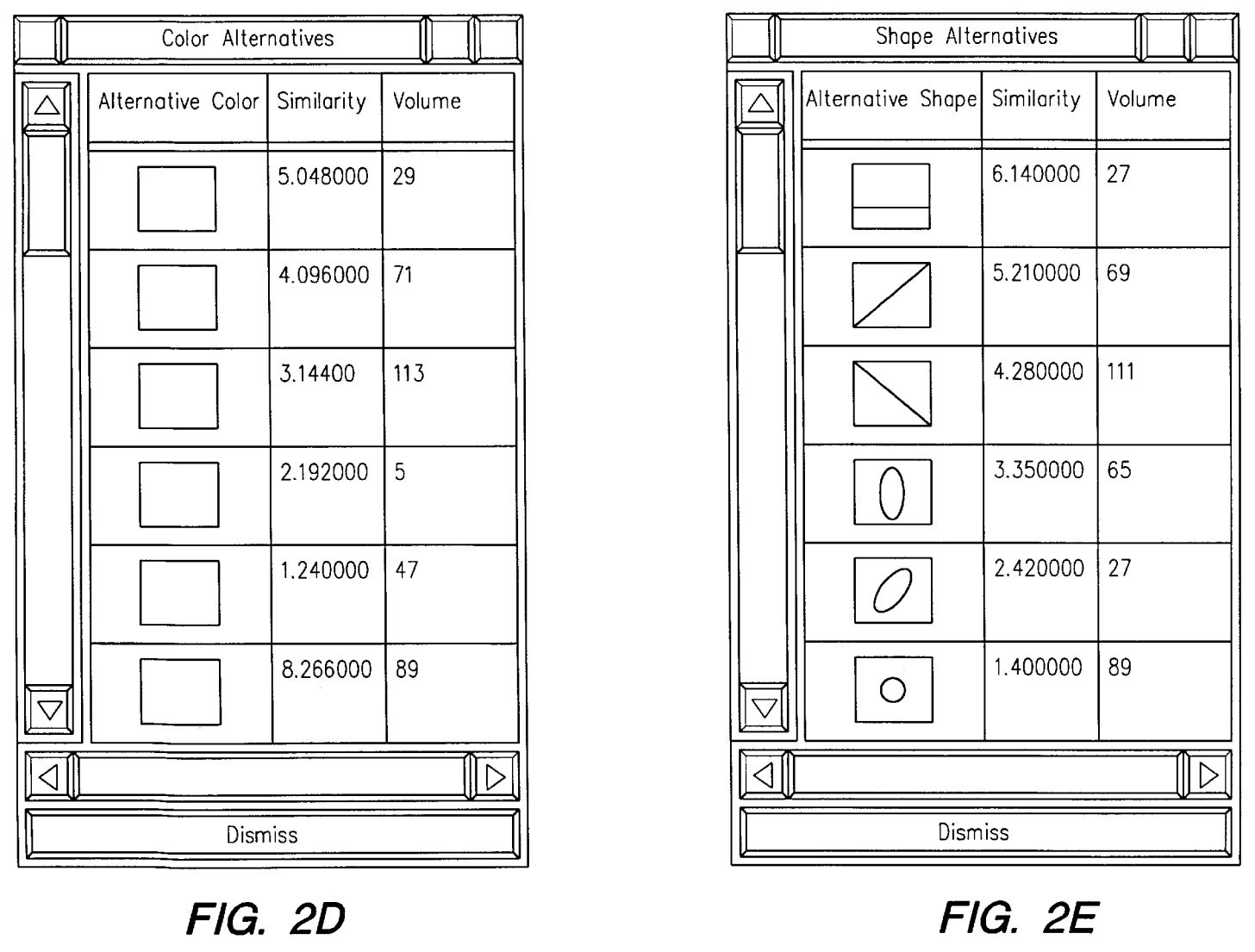

As system feedback, users can be presented with estimated numbers of matching images (based on colors and shapes) prior to query execution. Users can also be provided with system feedback suggesting alternative colors and shapes. The users would then know the distribution of image contents related to their current query criteria as shown in FIGS. 2(c) and 2(d). This allows users to change initial colors or shapes accordingly. To perform the above functionalities, SEMCOG utilizes selectivity values for colors and shapes.

Figure 7:
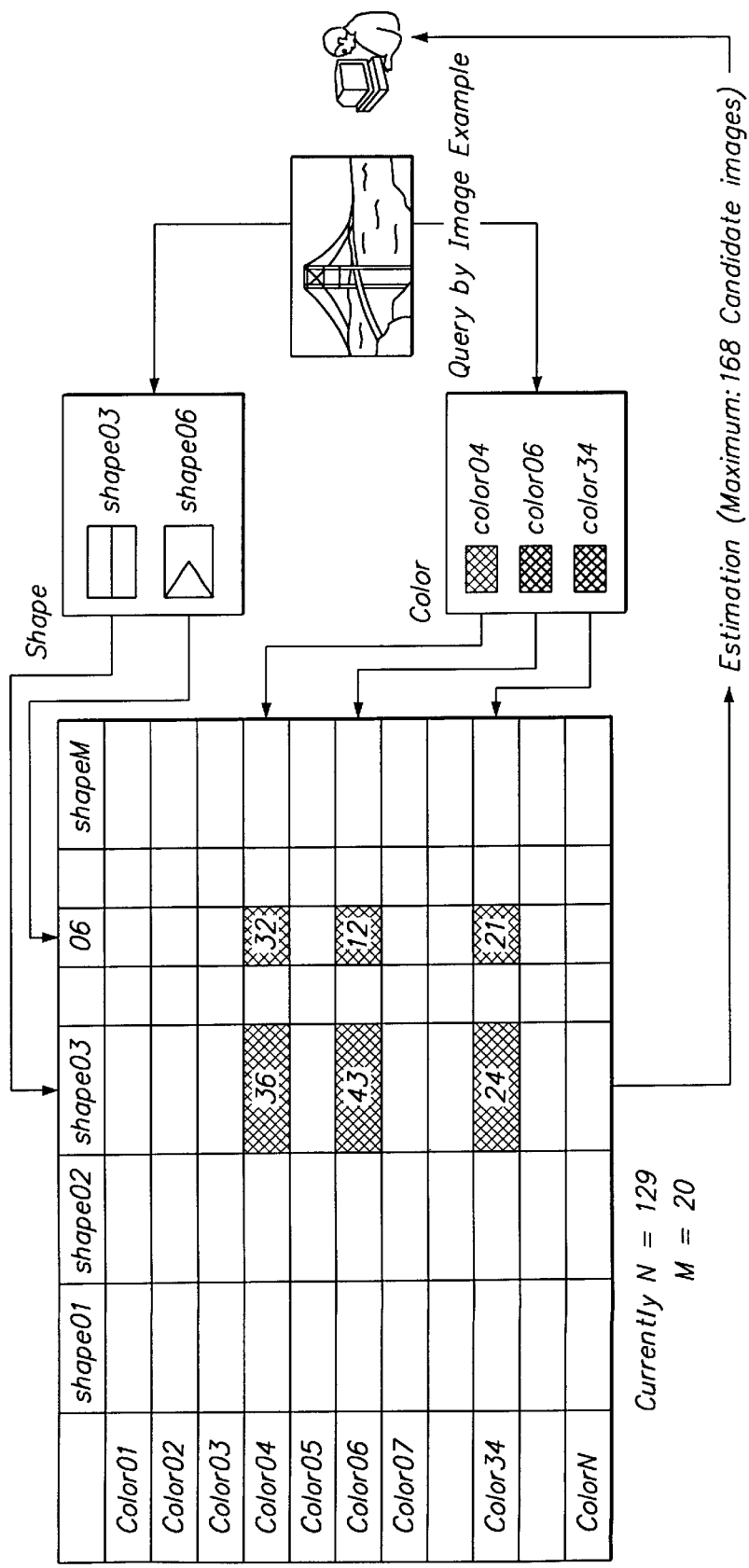
FIG. 7 shows the upper bound of an estimated number of matching images.
Figure 8:
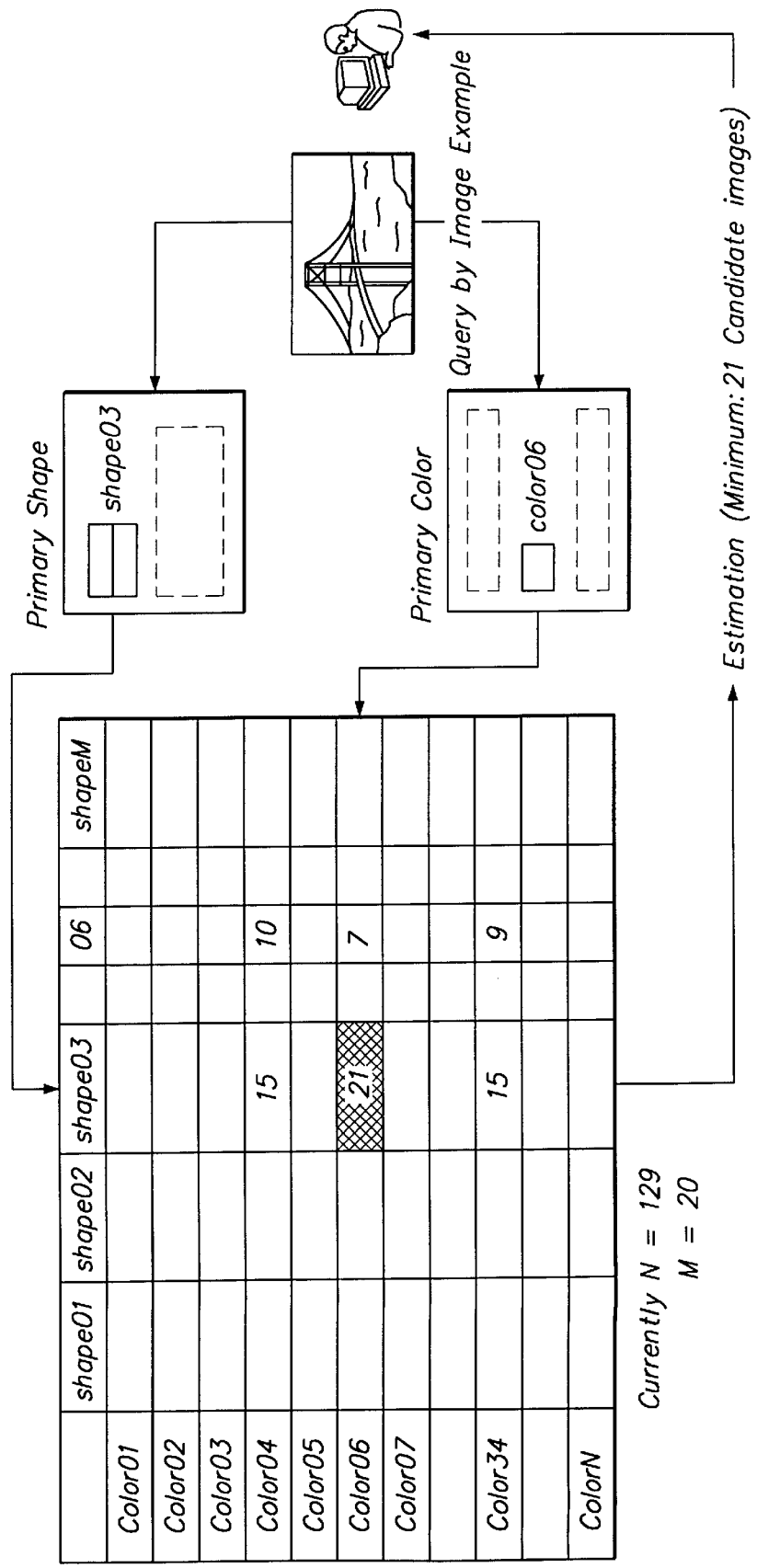
FIG. 8 shows the lower bound of an estimated number of matching images.

SEMCOG creates two tables where the two axes correspond to color and shape, respectively. Each slot in the table, then, corresponds to an integer denoting the number of images which contain the corresponding color and shape, as shown in FIGS. 7 and 8. Since 129 template colors and 20 template shapes are employed in this example, these two tables are 129 by 20. Note that in FIG. 7, all major colors and shapes are used. On the other hand, in FIG. 8, only the primary color and shape are used. Major colors are defined as follows. For an image I which has n colors C={$c_i$, $1 \leq i \leq n$}, and each color $c_i$ has pixels $p_i$ in I. The major colors are a subset C' of C, such that for every color $c_i \in C'$, the corresponding $p_i$ is greater than a threshold. The primary color is defined as $c_{pr} \in C'$ where $p_{pr}$ is max({$p_i | c_i \in C'$}). The major shapes are the primary shapes in the image.

With the two tables, in FIGS. 7 and 8, respectively, SEMCOG can estimate the maximum and minimum number of matches for a given query image. First, the calculation of the maximum number of matches will be discussed. As illustrated in FIG. 7, all the major shapes and colors in images are identified. In the example of the Golden Gate Bridge image, color04, color06, color34, shape03, and shape06 are extracted. The values in the slots (color04, shape03), (color06, shape03), (color34, shape03), (color04, shape06), (color06, shape06), and (color34, shape06) are summed to find the maximum number of possible matches (i.e. 168). Note that this estimation is based on the assumption that the images in the result will correspond to one and only one shape-color pair in the image; otherwise, there would be an over-estimation of the number of matches. However, this assumption is valid for the calculation of the maximum number of matches.

Second, the calculation of the minimum number of matches will be discussed. The system identifies the primary color and shape from the given image and uses the table location that corresponds to the corresponding color-shape slot for the minimum number of matches. As shown in FIG. 8, the system locates the value in the slot (color06, shape03), 21 as the estimated minimum number of matches for the given image. This approach is based on the assumption that the given image has only one major shape (i.e. its primary shape). This is the lower bound of number of matching images. If there are more then one equally likely color and shape combinations, the system may locate multiple slots. The minimum value among them is used as the minimum number of matches. These two techniques are suitable for estimating the number of matching images for query specification feedback for users and for query rewriting for processing optimization purposes.

The discussion just presented regarding the calculation of the maximum and minimum number of matches assumes that color and shape are equally important to a user. The above discussion is suitable for estimating the number of matching images for query specification feedback for users and for query rewriting for processing optimization. To calculate image similarity, a qualitative weighting scheme may be used according to a user's criteria for importance preference and the significance of each color and shape. For a given image I, the qualitative weighting scheme works as follows:

1. Extract the major colors and shapes from I and locate the corresponding shape-color pair, [$s_i$, $c_j$].
2. For each of the shape-color pairs, [$s_i$, $c_j$], in I, identify the number of pixels, num($c_j$), that have $c_j$ in the image and the significance of the shape. Since the significance of a shape can not be measured by number of pixels, it is measured using the ranking of $s_i$, ranking($s_i$), with respect to the shape similarity between $s_i$ and I.

3. For each shape-color pair [$s_i$, $c_j$] in I compute a weight:

$$w(s_i, c_j) = \alpha \times \left(1 - \frac{ranking(s_i)}{\sum_{\forall s_k \text{ in the image}} (ranking(s_k))}\right) + (1-\alpha) \times \frac{num(c_j)}{\# \text{ of pixels in the image}}$$

where α is a user specified parameter denoting the ratio of the importance of shape-based comparisons to color-based comparisons.

4. The number of matches is calculated considering the importance of color versus shape as follows:

$$\sum_{\forall (s_i c_j) \in I} w(s_i, c_j) \times \text{Matches}((s_i, c_j)),$$

where Matches ([$s_i$, $c_j$]) is the value stored in the table for the shape-color pair [$s_i$, $c_j$].

The use of the image database selectivity statistics to estimate numbers of matches and for query processing will now be discussed. In FIG. 2, an overview of the query result estimation process was given. This functionality of SEMCOG uses the semantical and visual selectivity values to avoid expensive query processing.

Assume that a user specifies a query to retrieve "images with two objects such that one of the objects is man and the other object is similar to car.gif." Also assume that the database statistics are as follows:

The total number of images is 50.
For simplicity, the images in the database contain at most two objects.
The number of matches for the conditions "containing at least two objects," "is(man,X)," and "i_like(car-gif, Y)" are 66, 27, and 18 respectively.
The total number of objects is 83.

Since the maximum number of objects in a given image is two, there is no difference between the number of images which contain at least two objects and the number of images which contain exactly two objects. However, in the present invention, there is a difference between the number of images which contain two objects and the number of matches for the query "images containing two objects." The number of matches is twice the number of images, since there are two matches for each image (i.e. one match for each object). Therefore, there are 33 (i.e. 66/2) images containing exactly two objects and 17 (i.e. 50–33) images containing exactly one object.

Using this information, the expected, maximum, and minimum number of matches for the above query are calculated as follows.

The calculation of expected number of matches is based on the assumption that the semantics of image objects are uniformly-distributed. Therefore, the estimated number of matches, based on probabilities, is P(there are at least two objects in the image)×
P(one object is man and the other object looks like car.gif|there are at least two objects in the image).

To solve the above probability, a conditional probability (the second term) is needed. However, this information is not in the given set of selectivity values. Its approximated probability is calculated as follows:

2×selectivity(man)×selectivity(car.gif).

Hence, the approximate probability is (33/50)×2×(27/83)×(18/83)=0.093, or the expected number of images satisfying the query is 50×0.093=4.65.

For databases containing images with more than two objects, the generalized formula for calculating the probability for P(one object is man and the other object looks like car.gif|there are at least two objects in the image) is as follows, assuming that the object probabilities are independent:

$$\sum_{i \geq 2} (P(\text{image has } i \text{ objects}) \times$$

$$P(\text{one object is man and the other looks like car.gif} \mid$$

$$\text{image has } i \text{ objects}))$$

which is equal to $$\sum_{i \geq 2} \left( \frac{\text{\# of images with } i \text{ objects}}{\text{total \# of images}} \times \text{permutation}(i, 2) \times P(\text{man}) \times P(\text{car.gif}) \right),$$

and is then equal to $$\sum_{i \geq 2} \left( \frac{\text{\# of images with } i \text{ objects}}{\text{total \# of images}} \times i! \times \right.$$

$$\left. (i-1)! \times \frac{\text{\# of man}}{\text{total \# of objects}} \times \frac{\text{\# of car.gif}}{\text{total \# of objects}} \right).$$

The following selectivity functions are denoted for the above example:

1. The selectivity function for the condition containing at least N objects as ObjectContainmentImageSelectivity(N).
2. The selectivity function for the semantics-based condition S as ObjectSemanticsSelectivity(S).
3. The selectivity function for the cognition-based condition C as ObjectCognitionSelectivity(C).

In this example, three selectivity values, ObjectContainmentImageSelectivity(2), ObjectContainmentImageSelectivity(1), ObjectSemanticsSelectivity(is(man)), and ObjectCognitionSelectivity(i-like(car.gif)), are required. The maximum number of matches is the minimum value of the object semantics selectivity; 18 in this example. In FIG. 9, three bars are used to represent selectivity for "is(man)", "i_like(car.gif)" and the estimated number of matching images for this query. The maximum number of matches is illustrated in FIG. 9(a), where the overlap are of the bars for "is(man)" and "i_like(car.gif)" is maximized. Assuming the objects with certain semantics are uniformly distributed images, the minimum number of matching images is computed as follows:

$$\left( \sum \text{ObjectSemanticsSelectivity} + \right.$$

$$\sum \text{ObjectCognitionSelectivity} -$$

$$\left. \sum_{N=1}^{2} (\text{ObjectContainmentImageSelectivity}(N)) \right)$$

if $\sum_{N=1}^{2} (\text{ObjectContainmentImageSelectivity}(N)) <$ $$\left( \sum \text{ObjectSemanticsSelectivity} + \right.$$

-continued $$\left. \sum \text{ObjectCognitionSelectivity} \right).$$

This is illustrated in FIG. 9(b) as if the total number of images was 37, instead of 50.

$$0 \text{ if } \sum_{N=1}^{2} \text{ObjectContainmentImageSelectivity}(N) \geq$$

$$\left( \sum \text{ObjectSemanticsSelectivity} + \sum \text{ObjectCognitionSelectivity} \right).$$

This is illustrated in FIG. 9(c). The minimum number of matches for this example is 0 because ObjectContainmentImageSelectivity(2)+ObjectContainmentImageSelectivity(1) (i.e. 33+17)> (ObjectSemanticsSelectivity(is(man))+ObjectCognitionSelectivity(i-like(car.gif)) (i.e. 27+18). Note that without the assumption that the objects with certain semantics are uniformly distributed in the images, the minimum number of matching images would be either 1 or 0. This is not meaningful for users, and is illustrated in FIGS. 14(d) and 14(e).

Based upon the above formula, the system calculates and provides users with the feedback on the expected, maximum and minimum numbers of matching images as 4.65, 18 and 0, respectively.

To calculate the minimum number of matching images for databases with images containing more than two objects, where the query is associated with M objects and M conditions, the minimum number of matching images is computed as follows:

$$\left( \sum \text{ObjectSemanticsSelectivity} + \right.$$

$$\left. \sum \text{ObjectCognitionSelectivity} \right) -$$

$$\sum_{N=1}^{M} (\text{ObjectContainmentImageSelectivity}(N))$$

if $\sum_{N=1}^{M} \text{ObjectContainmentImageSelectivity}(N) <$ $$\left( \sum \text{ObjectSemanticsSelectivity} + \right.$$

$$\left. \sum \text{ObjectCognitionSelectivity} \right).$$

0 if $$\sum_{N=1}^{M} \text{ObjectContainmentImageSelectivity}(N) \geq$$

$$\left( \sum \text{ObjectSemanticsSelectivity} + \right.$$

$$\left. \sum \text{ObjectCognitionSelectivity} \right).$$

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method of querying a database of images, comprising the steps of:
   (a) verifying a query by determining feedback information regarding:

(i) a maximum number of query matches, a minimum number of query matches and an estimated number of query matches;
(ii) alternative semantic-based query elements and alternative cognition-based query elements for elements of the query; and
(b) providing the feedback information to a user in a user window prior to processing the query.

2. The method according to claim 1, further comprising the steps of:
(c) using the feedback information to choose one of reformulating the query to form a reformulated query, narrowing the query to form a narrowed query, broadening the query to form a broadened query, and keeping the query without changes; and
(d) processing the chosen one of the reformulated query, the narrowed query, the broadened query and the query.

3. The method according to claim 1, wherein the step of verifying the query further comprises determining the feedback information regarding co-occurrences for the elements of the query, co-occurrences being objects appearing in a same image as the elements of the query.

4. The method according to claim 1, wherein the step of verifying the query further comprises determining the feedback information regarding selectivity for each of the elements of the query, the selectivity being a number of occurrences of the elements of the query in the database.

5. The method according to claim 1, further comprising the steps of:
specifying the query prior to the step of verifying the query; and
generating a query statement in Cognition and Semantics Query Language (CSQL), subsequent to specifying the query.

6. The method according to claim 1, wherein the step of verifying the query further comprises determining the feedback information regarding a similarity value between each of the alternative semantic-based query elements and the elements of the query and between each of the alternative cognition-based query elements and the elements of the query.

7. The method according to claim 1, wherein the step of verifying the query further comprises determining the feedback information regarding selectivity for each of the alternative semantic-based query elements and for each of the alternative cognition-based query elements, the selectivity being a number of occurrences of each of the alternative query elements in the database.

8. The method according to claim 3, wherein the step of verifying the query further comprises determining the feedback information regarding selectivity for each of the co-occurrences, the selectivity being a number of occurrences of each of the co-occurrences in the database.

9. The method according to claim 1, wherein the alternative cognition-based query elements comprise color and shape query elements.

10. The method according to claim 7, wherein the selectivity for the alternative semantic-based query elements is determined from a hierarchical structure of statistics regarding image object semantics, the statistics being stored in an index.

11. The method according to claim 10, wherein the hierarchical structure comprises indices for basic predicates and indices, derived from the indices for basic predicates, for derived predicates.

12. The method according to claim 7, wherein the selectivity for the alternative cognition-based query elements is based on image classification statistics, wherein the statistics account for color and shape query elements of the alternative cognition-based query elements.

13. The method according to claim 6, wherein the similarity value is calculated between predicates requiring identical semantics ("is") in accordance with the formula:

$$\text{Similarity} = 1 - \text{Distance}(\alpha, \beta)$$

wherein $\alpha$ and $\beta$ represent ones of the elements of the query and the alternative query elements.

14. The method according to claim 6, wherein the similarity value is calculated between a predicate requiring identical semantics ("is") and a predicate requiring similar semantics ("s_like"), where a is a term in the "is" predicate and in the "s_like" predicate, in accordance with the formula:

$$\frac{\sum_{i=1}^{n} 1 - \text{Distance}(\alpha, s_i)}{n},$$

where n is a number of synonyms of $\alpha$ and where each $s_i$, $1 \leq i \leq n$, is one of the synonyms.

15. The method according to claim 6, wherein the similarity value is calculated between a predicate requiring identical semantics ("is") and a predicate requiring semantic generalization ("is_a"), in accordance with the formula:

$$\frac{\sum_{i=1}^{m} (1 - \text{Distance}(\alpha, s_i))}{m},$$

where $\alpha$ is a term of the "is" predicate and $\beta$ is a term of the "is_a" predicate, $\beta$ is a hypernym of $\alpha$ and m is the number of hypernyms of $\beta$, excluding $\alpha$.

16. The method according to claim 6, wherein the similarity value is calculated between a predicate requiring similar semantics ("s_like"), and a predicate requiring semantic generalization ("is_a") in accordance with the formula:

$$\frac{\sum_{i=1}^{n} \sum_{j=1}^{m} (1 - \text{Distance}(h_j, s_i))}{m \times n},$$

where $\alpha$ is a term of the "s_like" predicate and $\beta$ is a term of the "is_a" predicate, where each $h_j$, $1 \leq j \leq m$ is a hypernym of $\beta$, m being the number of hypernyms, and each $s_i$, $1 \leq i \leq n$ is a synonym of $\alpha$, n being the number of synonyms.

17. The method according to claim 1, further comprising the steps of:
reformulating the query using the alternative query elements; and
ranking the alternative query elements based on similarity values between the elements of the query and each of the alternative query elements.

18. The method according to claim 1, wherein the maximum number of query matches is calculated in accordance with the following steps when the elements of the query are cognition-based query elements:
(i) identifying all major shapes and colors in the query; and (ii) summing selectivity for each shape, color pair in the query to produce the maximum number of query matches, the selectivity being a number of occurrences of each shape, color pair in the database.

19. The method according to claim 1, wherein the minimum number of query matches is calculated in accordance with the following steps when the elements of the query are cognition-based query elements:
   (i) identifying a primary shape and color in the query; and
   (ii) selecting a selectivity for a shape, color pair, comprising the primary shape and color in the query, as the minimum number of query matches, the selectivity being a number of occurrences of the shape, color pair in the database.

20. The method according to claim 1, wherein the step of verifying a query by determining the feedback information regarding the estimated number of matches takes into account weighing shape versus color, the estimated number of matches being determined in accordance with the following steps when the elements of the query are cognition-based query elements:
   (i) for each one of the images I in the database, extracting major shapes and colors;
   (ii) for each one of the images I in the database and for each shape-color pair, $<s_i, c_j>$, identifying a significance of the shape, ranking($s_i$), with respect to a shape similarity between $s_i$ and I, and a number of pixels, num($c_j$), in each I having $c_j$;
   (iii) for each of the shape-color pairs, $<s_i, c_j>$ in each I, computing a weight value in accordance with the formula $$w(s_i, c_j) = \alpha \times \left(1 - \frac{\text{ranking}(s_i)}{\sum_{\forall s_k \text{ in the image}} (\text{ranking}(s_k))}\right) +$$
$$(1-\alpha) \times \frac{num(c_j)}{\text{\# of pixels in the image}}$$

where $\alpha$ is a user specified parameter denoting a ratio of importance of shape-based comparisons to color-based comparisons; and
   (iv) calculating the number of estimated number of matches in accordance with the formula:

$$\sum_{\forall \langle s_i c_j \rangle \in I} w(s_i, c_j) \times \text{Matches}(\langle s_i, c_j \rangle),$$

where Matches ($<s_i, c_j>$) is a selectivity for the shape-color pair $<s_i, c_j>$, the selectivity being a number of occurrences of each shape, color pair in the database.

21. The method according to claim 1, wherein the estimated number of query matches is determined in accordance with the following formula when the elements of the query are semantics-based query elements:

$$\sum_{i \geq 2} (P(\text{image has } i \text{ objects}) \times$$

$P(\text{one object is } object1 \text{ and other looks like } object2 \mid$
image has $i$ objects)) =

$$\sum_{i \geq 2} \left(\frac{\text{\# of images with } i \text{ objects}}{\text{total \# of images}} \times \text{permutation}(i, 2) \times\right.$$

$$P(object1) \times P(object2)\bigg) =$$

$$\sum_{i \geq 2} \left(\frac{\text{\# of images with } i \text{ objects}}{\text{total \# of images}} \times i! \times (i-1)! \times\right.$$

$$\left.\frac{\text{\# of } object1}{\text{total \# of objects}} \times \frac{\text{\# of } object2}{\text{total \# of objects}}\right),$$

where object1 and object2 are ones of the elements of the query and i is the number of objects in the images in the database.

22. The method according to claim 1, wherein the maximum number of query matches is equal to a minimum of selectivity for each of the elements of the query when the elements of the query are semantics-based query elements, the selectivity being a number of occurrences of the elements of the query in the database.

23. The method according to claim 1, wherein the minimum number of query matches is determined in accordance with the following formula when the elements of the query are semantics-based query elements:

(a) $\left(\sum ObjectSemanticsSelectivity + \right.$
$\left.\sum ObjectCognitionSelectivity\right) -$
$\sum_{N=1}^{M} (ObjectContainmentImageSelectivity(N))$ when $\sum_{N=1}^{M} \left(ObjectContainmentImageSelectivity(N) < \right.$ $\left(\sum ObjectSemanticsSelectivity + \right.$
$\sum ObjectCognitionSelectivity$; and (b) 0 when $\sum_{N=1}^{M} ObjectContainmentImageSelectivity(N) \geq$ $\left(\sum ObjectSemanticsSelectivity + \sum ObjectCognitionSelectivity\right),$ where M is the number of objects associated with the query, the ObjectSemanticsSelectivity is a selectivity for a semantics-based condition, ObjectCognitionSelectivity is a selectivity for a cognition-based condition and ObjectContainmentImageSelectivity is a selectivity for a condition containing M objects, where the selectivity is a number of occurrences of the condition in the database.

24. The method according to claim 1, wherein the database comprises one of a multimedia database, a hypermedia database and a database on the World Wide Web.

25. An apparatus for querying a database of images, the apparatus comprising:
   a computer system for verifying a query by determining feedback information regarding:
      (i) a maximum number of query matches, a minimum number of query matches and an estimated number of query matches;
      (ii) alternative semantic-based query elements and alternative cognition-based query elements for elements of the query; and
   a display, wherein the feedback information is displayed on the display prior to processing the query.

26. The apparatus according to claim 25, wherein the computer system further comprises: a query verifier for providing the feedback information regarding the maximum number of query matches, the minimum number of query matches and the estimated number of query matches.

27. The apparatus according to claim 26, wherein the computer system further comprises:
   (a) a terminology manager for determining the feedback information regarding alternative semantics query elements;
   (b) an image data query processor for determining the feedback information regarding alternative cognition-based query elements; and
   (c) a facilitator for coordinating interactions between components of the computer system.

28. The apparatus according to claim 26, wherein a user of the user workstation uses the feedback information to choose one of reformulating the query to form a reformulated query, narrowing the query to form a narrowed query, broadening the query to form a broadened query and keeping the query without changes, and wherein the computer system processes the chosen one of the reformulated query, the narrowed query, the broadened query and the query.

29. The apparatus according to claim 26, wherein the computer system further comprises: an image semantics editor for assigning image semantics to the images in the database to provide the alternative semantics-based query elements, said image semantics being stored in an image metadata database along with visual characteristics of the images in the database.

30. The apparatus according to claim 29, wherein the computer system further comprises: a textual data query processor for processing the query when the query concerns image or object semantics stored as textual data.

31. The apparatus according to claim 26, wherein query verifier of the computer system verifies the query for further providing the feedback information regarding co-occurrences for the elements of the query, co-occurrences being objects appearing in a same image as the elements of the query.

32. The apparatus according to claim 26, wherein the query verifier of the computer system verifies the query by further providing the feedback information regarding selectivity for each of the elements of the query, the selectivity being a number of occurrences of the elements of the query in the database.

33. The apparatus according to claim 25, wherein the user of the user workstation specifies the query prior to the computer system verifying the query and wherein the computer system generates a query statement in Cognition and Semantics Query Language (CSQL), subsequent to the user specifying the query.

34. The apparatus according to claim 26, wherein the query verifier of the computer system verifies the query by further providing the feedback information regarding a similarity value between each of the alternative semantic-based query elements and the elements of the query and between each of the alternative cognition-based query elements and the elements of the query.

35. The apparatus according to claim 29, wherein the query verifier of the computer system verifies the query by further providing the feedback information regarding selectivity for each of the alternative semantic-based query elements and for each of the alternative cognition-based query elements, the selectivity being a number of occurrences of each of the alternative query elements in the database.

36. The apparatus according to claim 31, wherein the query verifier of the computer system verifies the query by further providing the feedback information regarding selectivity for each of the co-occurrences, the selectivity being a number of occurrences of each of the co-occurrences in the database.

37. The apparatus according to claim 25, wherein the alternative cognition-based query elements comprise color and shape query elements.

38. The apparatus according to claim 35, wherein the selectivity for the alternative semantic-based query elements is based on a hierarchical structure of statistics regarding image object semantic.

39. The apparatus according to claim 38, wherein the hierarchical structure comprises indices for basic predicates and indices, derived from the indices for basic predicates, for derived predicates.

40. The apparatus according to claim 38, wherein the computer system further comprises a semantics index for building the hierarchical structure of statistics, the structure being stored in an image semantics database, wherein the query verifier uses the structure stored in the image semantics database and the image metadata database to provide the selectivity.

41. The apparatus according to claim 35, wherein the selectivity for the alternative cognition-based query elements is based on image classification statistics, stored in the image metadata database, wherein the statistics account for color and shape query elements of the alternative cognition-based query elements.

42. The apparatus according to claim 34, wherein the similarity value is calculated between predicates requiring identical semantics ("is") in accordance with the formula:

$$\text{Similarity} = 1 - \text{Distance}(\alpha, \beta)$$

wherein $\alpha$ and $\beta$ represent ones of the elements of the query and the alternative query elements.

43. The apparatus according to claim 34, wherein the similarity value is calculated between a predicate requiring identical semantics ("is") and a predicate requiring similar semantics ("s_like"), where $\alpha$ is a term in the "is" predicate and in the "s_like" predicate, in accordance with the formula:

$$\frac{\sum_{i=1}^{n} 1 - \text{Distance}(\alpha, s_i)}{n},$$

where n is a number of synonyms of $\alpha$ and where each $s_i$, $1 \leq i \leq n$, is one of the synonyms.

44. The apparatus according to claim 34, wherein the similarity value is calculated between a predicate requiring identical semantics ("is") and a predicate requiring semantic generalization ("is_a"), in accordance with the formula:

$$\frac{\sum_{i=1}^{m} (1 - \text{Distance}(\alpha, s_i))}{m},$$

where $\alpha$ is a term of the "is" predicate and $\beta$ is a term of the "is_a" predicate, $\beta$ is a hypernym of $\alpha$ and m is the number of hypernyms of $\beta$, excluding $\alpha$.

45. The apparatus according to claim 34, wherein the similarity value is calculated between a predicate requiring similar semantics ("s_like"), and a predicate requiring semantic generalization ("is_a") in accordance with the formula:

$$\frac{\sum_{i=1}^{n}\sum_{j=1}^{m}(1-\text{Distance}(h_j, s_i))}{m \times n},$$

where α is a term of the "s_like" predicate and β is a term of the "is_a" predicate, where each $h_j$, $1 \leq j \leq m$ is a hypernym of β, m being the number of hypernyms, and each $s_i$, $1 \leq i \leq n$ is a synonym of α, n being the number of synonyms.

46. The apparatus according to claim 25, wherein the computer system reformulates the query using the alternative query elements and ranks the alternative query elements based on similarity values between the elements of the query and each of the alternative query elements.

47. The apparatus according to claim 25, wherein the computer system calculates the maximum number of query matches, when the elements of the query are cognition-based query elements, by:
 (i) identifying all major shapes and colors in the query; and
 (ii) summing selectivity for each shape, color pair in the query to produce the maximum number of query matches, the selectivity being a number of occurrences of each shape, color pair in the database.

48. The apparatus according to claim 25, wherein the computer system calculates the minimum number of query matches, when the elements of the query are cognition-based query elements, by:
 (i) identifying a primary shape and color in the query; and
 (ii) selecting a selectivity for a shape, color pair, comprising the primary shape and color in the query, as the minimum number of query matches, the selectivity being a number of occurrences of the shape, color pair in the database.

49. The apparatus according to claim 25, the computer system calculates the estimated number of matches when the elements of the query are cognition-based query elements, taking into account weighing shape versus color, by:
 (i) for each one of the images I in the database, extracting major shapes and colors;
 (ii) for each one of the images I in the database and for each shape-color pair, $<s_i, c_j>$, identifying a significance of the shape, ranking($s_i$), with respect to a shape similarity between $s_i$ and I, and a number of pixels, num($c_j$), in each I having $c_j$;
 (iii) for each of the shape-color pairs, $<s_i, c_j>$ in each I, computing a weight value in accordance with the formula $$w(s_i, c_j) = \alpha \times \left(1 - \frac{\text{ranking}(s_i)}{\sum_{\forall s_k \text{ in the image}}(\text{ranking}(s_k))}\right) +$$

$$(1-\alpha) \times \frac{num(c_j)}{\text{\# of pixels in the image}}$$

where α is a user specified parameter denoting a ratio of importance of shape-based comparisons to color-based comparisons; and
 (iv) calculating the number of estimated number of matches in accordance with the formula:

$$\sum_{\forall \langle s_i c_j \rangle \in I} w(s_i, c_j) \times \text{Matches}(\langle s_i, c_j \rangle),$$

where Matches ($<s_i, c_j>$) is a selectivity value for the shape-color pair $<s_i, c_j>$), the selectivity being a number of occurrences of each shape, color pair in the database.

50. The apparatus according to claim 25, wherein the computer system determines the estimated number of query matches in accordance with the following formula when the elements of the query are semantics-based query elements:

$$\sum_{i \geq 2}(P(\text{image has } i \text{ objects}) \times$$

$$P(\text{one object is } object1 \text{ and other looks like } object2 \mid$$

$$\text{image has } i \text{ objects})) =$$

$$\sum_{i \geq 2}\left(\frac{\text{\# of images with } i \text{ objects}}{\text{total \# of images}} \times \text{permutation}(i, 2) \times\right.$$

$$P(object1) \times P(object2)\bigg) =$$

$$\sum_{i \geq 2}\left(\frac{\text{\# of images with } i \text{ objects}}{\text{total \# of images}} \times i! \times (i-1)! \times\right.$$

$$\left.\frac{\text{\# of } object1}{\text{total \# of objects}} \times \frac{\text{\# of } object2}{\text{total \# of objects}}\right),$$

where object1 and object2 are ones of the elements of the query and i is the number of objects in the images in the database.

51. The apparatus according to claim 25, wherein the computer system determines the maximum number of query matches to be equal to a minimum of selectivity for each of the elements of the query when the elements of the query are semantics-based query elements, the selectivity being a number of occurrences of the elements of the query in the database.

52. The apparatus according to claim 25, wherein the computer system determines the minimum number of query matches in accordance with the following formula when the elements of the query are semantics-based query elements:

(a) $\left(\sum ObjectSemanticsSelectivity + \right.$ $\sum ObjectCognitionSelectivity\bigg) -$ $\sum_{N=1}^{M}(ObjectContainmentImageSelectivity(N))$ when $\sum_{N=1}^{M}\bigg(ObjectContainmentImageSelectivity(N) <$ $\left(\sum ObjectSemanticsSelectivity + \right.$ $\sum ObjectCognitionSelectivity\bigg);$ and (b) 0 when $\sum_{N=1}^{M} ObjectContainmentImageSelectivity(N) \geq$ $\left(\sum ObjectSemanticsSelectivity + \sum ObjectCognitionSelectivity\right),$ where M is the number of objects associated with the query, the ObjectSemanticsSelectivity is a selectivity for a semantics-based condition, ObjectCognitionSelectivity is a selectivity for a cognition-based condition and ObjectContainmentImageSelectivity is a selectivity for a condition containing M objects, where the selectivity is a number of occurrences of the condition in the database.

53. The system according to claim 25, wherein the database of images comprises one of a multimedia database, a hypermedia database and a database on the World Wide Web.

* * * * *